(12) United States Patent
Bordoloi et al.

(10) Patent No.: US 7,839,404 B2
(45) Date of Patent: Nov. 23, 2010

(54) SYSTEMS AND METHODS OF DIRECT VOLUME RENDERING

(75) Inventors: Udeepta D. Bordoloi, Milpitas, CA (US); Lining Yang, East Windsor, NJ (US); Min Xie, Plainsboro, NJ (US); Gabriel Artaud, East Windsor, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 818 days.

(21) Appl. No.: 11/769,135

(22) Filed: Jun. 27, 2007

(65) Prior Publication Data

US 2008/0024493 A1   Jan. 31, 2008

Related U.S. Application Data

(60) Provisional application No. 60/833,120, filed on Jul. 25, 2006.

(51) Int. Cl.
*G06T 15/00* (2006.01)
(52) U.S. Cl. .................. 345/424; 345/419; 382/152; 382/154
(58) Field of Classification Search ................ 345/419, 345/424; 382/152, 154
See application file for complete search history.

(56) References Cited

U.S. PATENT DOCUMENTS 6,664,961 B2 * 12/2003 Ray et al. ................. 345/424

(Continued)

OTHER PUBLICATIONS

Nelson Max, "Optical Models for Direct Volume Rendering", University of California, Davis, and Lawrence Livermore National Library.

(Continued)

*Primary Examiner*—Phu Nguyen
(74) *Attorney, Agent, or Firm*—Peter Kendall

(57) ABSTRACT

A method and system of increasing the speed of a ray-casting algorithm for producing direct volume rendering images in the melt-through interaction mode. Since the viewing direction is not changed during a melt-through interaction, it is possible to reuse the samples calculated along each ray from one frame to another. The samples along each ray are partitioned into different groups, and the samples within each partition can be composited to generate an RGBA-tuple (Red Green Blue and Alpha, which is an opacity factor) for the partition. The associative property of the composition operation allows computation of the final RGBA value for each ray by compositing the RGBA-values of the partitions, instead of compositing the RGBA-values of each sample along the ray.

36 Claims, 13 Drawing Sheets

U.S. PATENT DOCUMENTS

| | | | |
|---|---|---|---|
| 6,674,430 B1 * | 1/2004 | Kaufman et al. | 345/419 |
| 7,133,041 B2 * | 11/2006 | Kaufman et al. | 345/419 |
| 7,355,597 B2 * | 4/2008 | Laidlaw et al. | 345/419 |
| 7,471,291 B2 * | 12/2008 | Kaufman et al. | 345/424 |
| 2005/0285858 A1 | 12/2005 | Yang et al. | |

OTHER PUBLICATIONS

Marc Levoy, "Display of Surfaces from Volume Data", IEEE Computer Graphics and Applications, vol. 8, No. 3, pp. 29-37, 1988.

Marc Levoy, "Volume Rendering by Adaptive Refinement", The Visual Computer: International Journal of Computer Graphics, 6(1):2-7, 1990, 6 pages.

Marc Levoy, "Efficient Ray Tracing of Volume Data", Technical Report 88-029, Computer Science Department, University of North Carolina at Chapel Hill (1988).

LaCroute et al., "Fast Volume Rendering Using a Shear-Warp Factorization of the Viewing Transformation", Proc. Siggraph 94, ACM Press, New York, pp. 451-458.

John Pawasaukas, "Volume Visualization With Ray Casting", CS563-Advanced Topics in Computer Graphics, Feb. 18, 1997, pp. 1-15.

Winter, "Field-Based Modelling and Rendering", A thesis submitted to the University of Wales in candidature for the degree of Philosophiaw Doctor, Department of Computer Science, University of Wales, Swansea, Dec. 2002.

* cited by examiner

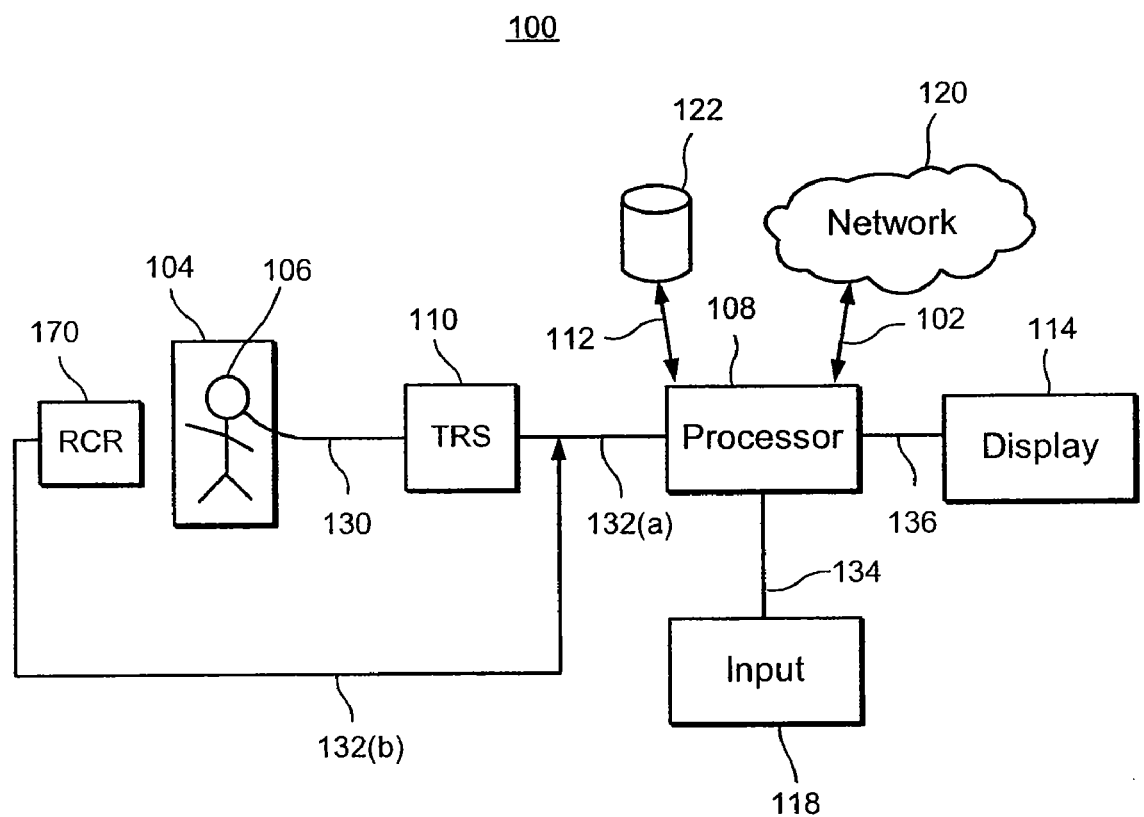
F I G. 1

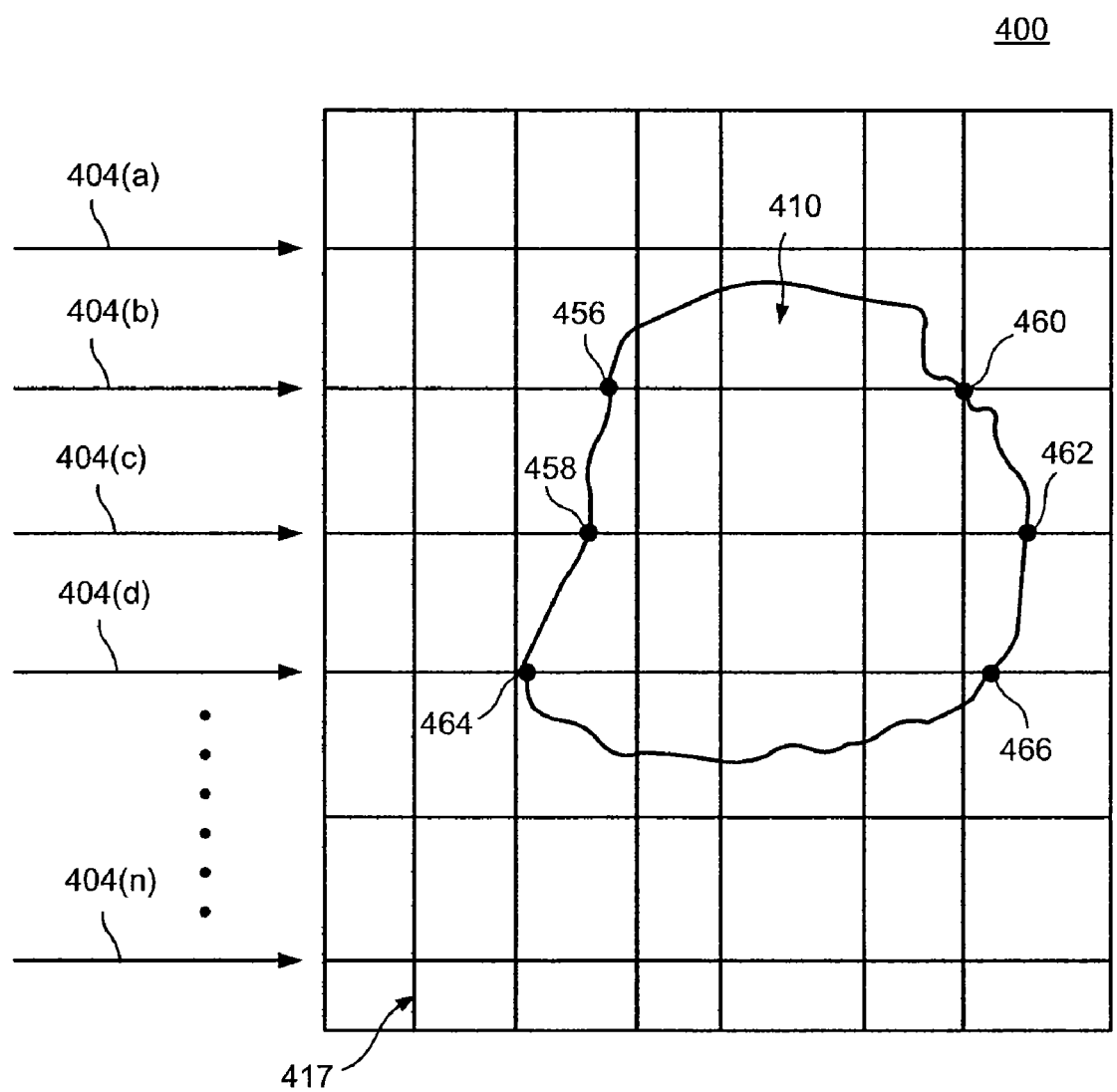
F I G. 4

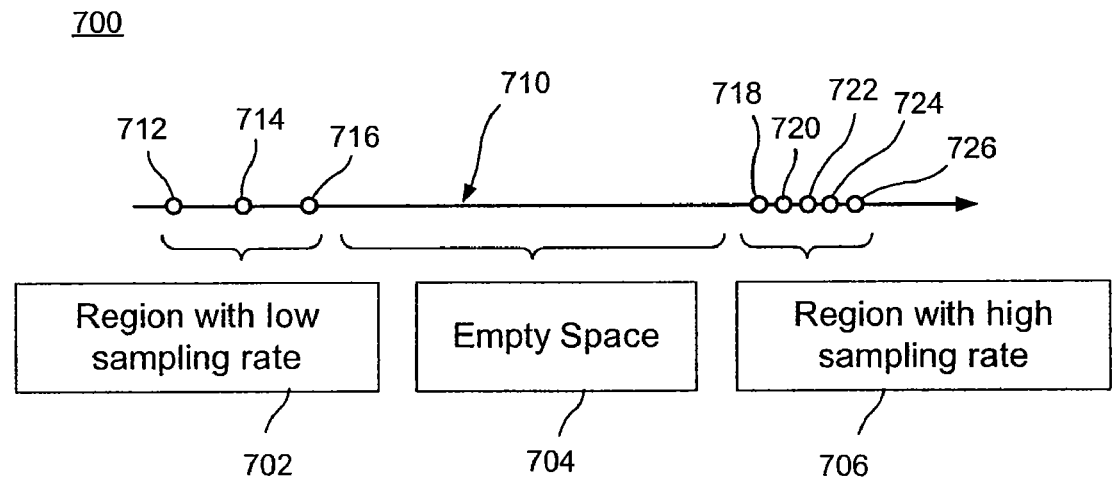
F I G. 7
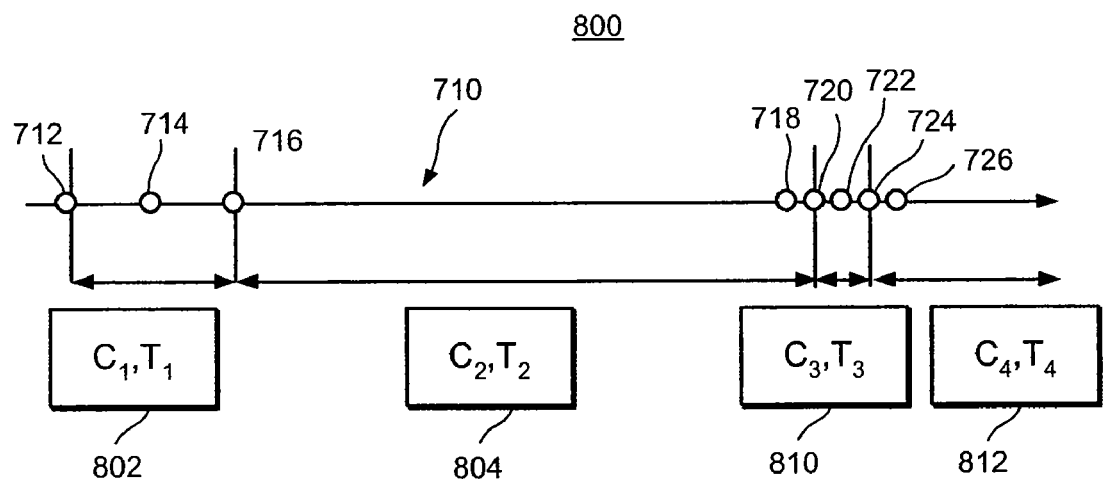
F I G. 8

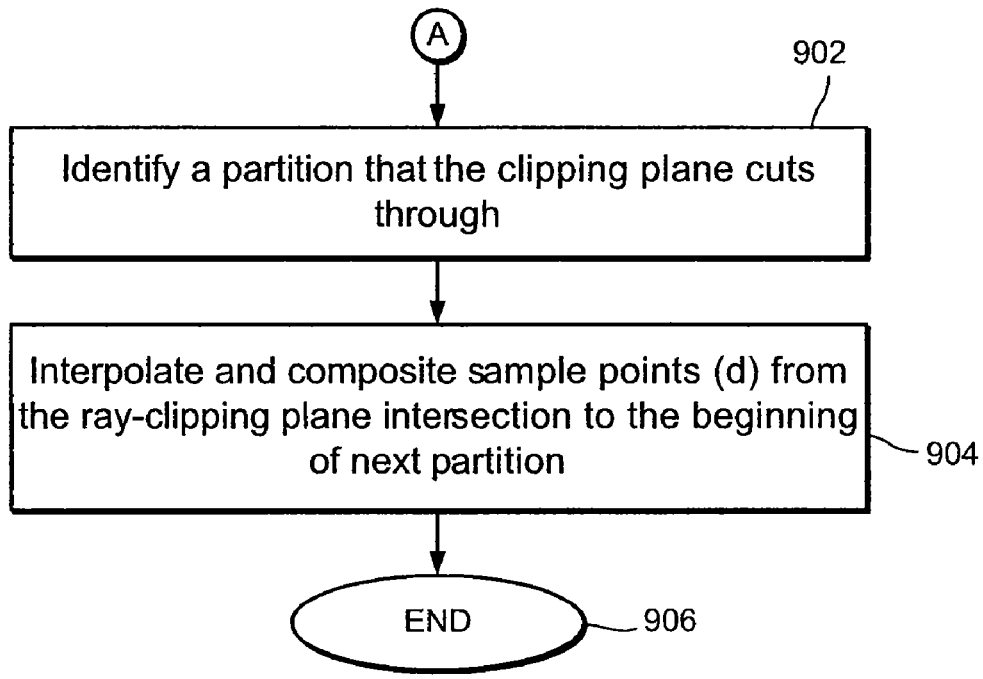
F I G. 9
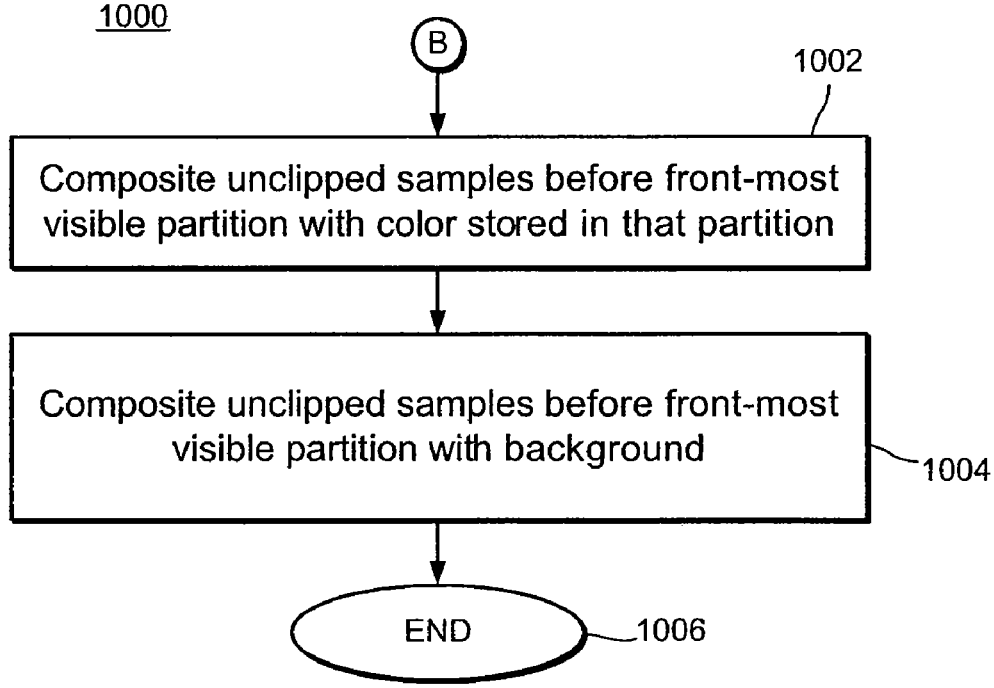
F I G. 10

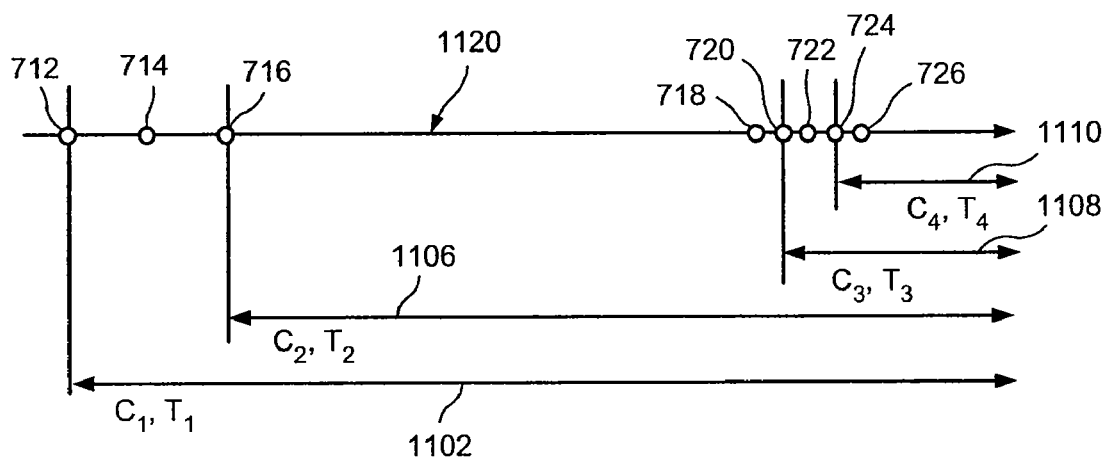
F I G. 11
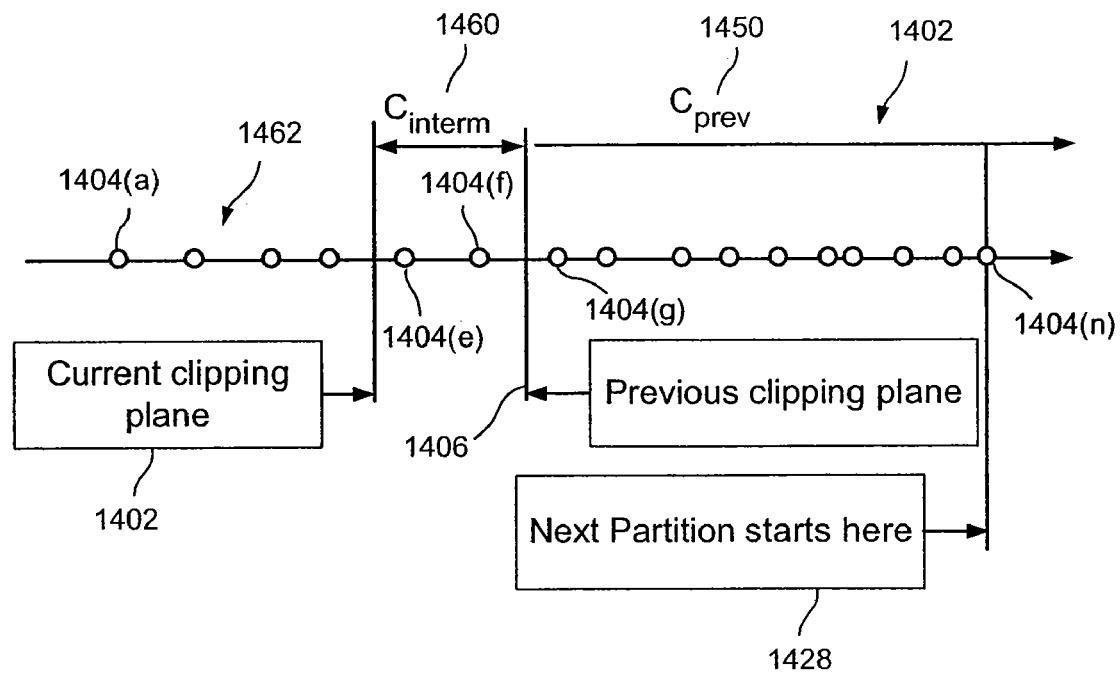
F I G. 14

SYSTEMS AND METHODS OF DIRECT VOLUME RENDERING

CROSS-REFERENCE TO RELATED APPLICATIONS

This application claims a priority benefit to provisional application Ser. No. 60/833,120, filed on Jul. 25, 2006 and entitled "Apparatus And Method For Providing Fast Melt-through For Direct Volume Rendering," which is hereby incorporated by reference in its entirety herein.

BACKGROUND

1. Field of the Invention

This invention relates generally to imaging systems. More specifically, the present invention is directed to systems and methods of increasing the speed of a ray-casting to produce direct volume rendering images in the melt-through interaction mode.

2. Background Discussion

Medical imaging techniques provide doctors and medical technicians with valuable data for patient diagnosis and care. Various imaging techniques include cardiac angiography, peripheral angiography, radiography, computed tomography and positron emission tomography. All of these imaging techniques produce medical images that are studied by medical personnel. A higher quality image leads to more accurate diagnosis.

Radiography is the use of certain spectra of electromagnetic radiation, usually x-rays, to image a human body. Angiography, a particular radiographic method, is the study of blood vessels using x-rays. An angiogram uses a radiopaque substance, or contrast medium, to make the blood vessels visible under x-ray. Angiography is used to detect abnormalities, including narrowing (stenosis) or blockages (occlusions), in the blood vessels throughout the circulatory system and in certain organs.

Cardiac angiography, also known as coronary angiography, is a type of angiographic procedure in which the contrast medium is injected into one of the arteries of the heart, in order to view blood flow through the heart, and to detect obstruction in the coronary arteries, which can lead to a heart attack.

Peripheral angiography, in contrast, is an examination of the peripheral arteries in the body; that is, arteries other than the coronary arteries. The peripheral arteries typically supply blood to the brain, the kidneys, and the legs. Peripheral angiograms are most often performed in order to examine the arteries which supply blood to the head and neck, or the abdomen and legs.

Computed Tomography (CT), originally known as computed axial tomography (CAT or CT scan), is an imaging technique that uses digital geometry processing to generate a three dimensional image of internal features of an object from a series of two-dimensional x-ray images taken around a single axis of rotation. An iodine dye, or other contrast material, may be used to make structures and organs easier to see on the CT picture. The dye may be used to check blood flow, find tumors, and examine other problems.

Positron emission tomography (PET) imaging may also be used. In PET imaging, a short-lived radioactive tracer isotope, which decays by emitting a positron, and which has been chemically incorporated into a metabolically active molecule, is injected into the patient. The radioactive decay of the positrons is measured to generate an image.

When imaging techniques produce images, the images have a dataset of pixels or voxels (described in more detail below) that can be modified to increase the image quality. For example, medical volumetric dataset sizes have been expanding rapidly with the new advanced CT scanners. For example, typical CT machines from Siemens® Medical Solutions can generate a pixel image dataset at a size of 512×512×4096. The capacity to visualize such datasets with high interactivity and high image quality is helpful to medical professionals in diagnosing disease.

Ray-casting is one technique to generate images. However, interactivity is difficult to achieve due to intensive computation and cache-unfriendly memory access. The large number of sampling rays, which grow as a function of $O(n^2)$ (where n is image resolution), makes the technique even less efficient.

Volume rendering is one of the most extensively used methods for visualizing volumetric (three-dimensional) data. With three-dimensional datasets becoming more prevalent, volume rendering has come to be widely used in many industrial and research applications. It is of particular importance in clinical scenarios, where radiologists regularly study patient data output from different kinds of scanners (CT, MRI, PET etc.).

There are different volume visualization techniques that can be effectively used to study and understand the volumetric data. The particular technique used depends on the insights desired, and also on the kind of data being visualized. One technique is Direct Volume Rendering (DVR), which is very effective to illustrate the shape of the data features, and can be used with all types of scanner data. In this technique, a color (and opacity) property is assigned to each data value using a Transfer Function. The color value seen at a pixel on the screen is the composition of all the colored data voxels that project to that particular pixel. There are a variety of rendering algorithms for creating a DVR image—some are software-based methods (ray-casting, shearwarp), others use graphics (NVIDIA, ATI) or special hardware (e.g., VolumePro).

Volume visualization environments typically support user interactions in different forms. For example, users usually can perform rotation, translation and scaling (zoom) on the object (volume dataset) being shown, and also cut away parts of the object using clipping planes. One particular interaction mode, which is referred to as melt-through, allows the user to translate and rotate the clipping plane, but does not allow the object to be rotated. The interaction sequence for melt-through proceeds as follows first, the user will position the object as desired using one or a combination of rotation, translation, and scaling. Other interactions like moving the clipping plane are permitted. Next, the user enters the melt through mode and moves the clipping plane forward and backward (translation), or tilt it (rotation) without changing the object orientation and viewing direction. The user can get out of the melt-through mode and rotate the object freely, repeating the steps above.

Melt-through is essentially an interactive operation. To sustain the efficiency of the radiologists, it is very important that the visualization tool provides high frame-rates, high image quality with large image size (often $1024^2$ in size). These requirements pose a number of challenges to the rendering tools.

One challenge is that the high performance of interactive rendering is often achieved by trading the image quality with performance. The final high quality image is rendered only after the user positioned the volume during the interactive mode. High image quality and high performance during the melt-through interaction is a big challenge to the rendering method. In addition, the rendering time of raycaster based method is proportional to the image area size. Enlarging the image from $512^2$ to $1024^2$ increases the computation of rendering by four times. Finally, with larger and larger datasets generated by medical scanners these days, it is becoming progressively more difficult to maintain high frame-rates during the melt-through operation.

Therefore, it would be an advancement in the state of the art to support a high frame rate with large size and high quality images for the melt-through mode.

SUMMARY

Accordingly, an embodiment of the present invention is directed to an apparatus and method for providing fast melt-through for direct volume rendering.

One embodiment of the present invention is directed to a method for rendering an image using raycast visualization. The method includes a 1.) pre-processing procedure that includes computing a sample sequence along each ray that passes through volumetric data; dividing each sample sequence of each ray into a plurality of partitions (m), each partition (m) having a number of sample points (d); compositing, for each ray, each sample point (d) of each partition (m) to produce an RBGA-tuple for each partition; and storing the RBGA-tuple for each partition. The method also includes 2.) a volume rendering procedure for each ray comprising identifying a location of an intersection of a ray with a clipping plane; compositing the stored RBGA-tuple of each partition subsequent to the clipping plane; and rendering the volumetric image using the composited RBGA-tuple of each partition subsequent to the clipping plane.

Another embodiment of the present invention is directed to the method described above, wherein the volume rendering step further includes identifying a partition that the clipping plane cuts through, and interpolating and compositing sample points (d) from the ray-clipping plane intersection to the beginning of a next partition.

Yet another embodiment of the present invention is directed to the method described above wherein the partition contains composited samples from the beginning of the partition to the beginning of a next partition.

Yet another embodiment of the present invention is directed to the method described above wherein the partition contains composited samples from the beginning of the partition to the end of the ray.

Yet another embodiment of the present invention is directed to the method described above and also includes generating a buffer that has a size (1) that is a function of the size of the partition (m). The (1) number of sampling points are stored in the buffer for each ray and the buffer is utilized in the rendering step.

Yet another embodiment of the present invention is directed to the method described above wherein the number of sample points (1) are located forward and backward of the intersection of the ray and the clipping plane.

Yet another embodiment of the present invention is directed to the method described above and also includes determining whether the buffer overlaps a portion of the buffer of a previous frame. Sample points of the buffer from the previous frame are reused for the overlapping portion; and new sample points are computed for the buffer for the non-overlapping portion.

Yet another embodiment of the present invention is directed to the method described above and also includes identifying a first position of a ray-clipping plane intersection of the first rendering frame and determining movement of the clipping plane. A second position of the ray-clipping plane intersection in the next frame is identified and intermediate sample points located between the first position of the clipping plane and the second position of the clipping plane are identified. The intermediate sample points are composited and utilized in the rendering step.

Yet another embodiment of the present invention is directed to the method described above and also includes adding the composited intermediate sample points to the result of the previous rendering frame.

Yet another embodiment of the present invention is directed to the method described above and subtracting the composited intermediate sample points from the result of the previous rendering frame.

Yet another embodiment of the present invention is directed to the method described above also includes identifying a transparent region of the volumetric data, the transparent region having an opacity value that does not exceed a predetermined threshold. A non-empty sample point is identified as a starting point of the transparent region and a non-empty sample point is identified as an ending point of the transparent region. The starting point and the ending point are stored and the position of the ray-clipping plane intersection of the first rendering frame and the position of the ray-clipping plane intersection of the second rendering frame are determined.

Yet another embodiment of the present invention is directed to the method described above also includes re-using a previous frame's result when the position of the ray-clipping plane intersection of the first rendering frame and the position of the ray-clipping plane intersection of the second rendering frame are within the same transparent region.

Yet another embodiment of the present invention is directed to the method described above also includes utilizing a sampling procedure when the position of the ray-clipping plane intersection of the first rendering frame and the position of the ray-clipping plane intersection of the second rendering frame are not within the same transparent region. This sampling procedure may be, for example, any of the sampling procedures described herein.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative aspects of the invention are described herein in connection with the following description and the accompanying drawings. These aspects are indicative, however, of but a few of the various ways in which the principles of embodiments of the invention may be employed and are intended to include all such aspects and their equivalents. Other advantages, embodiments and novel features of the invention may become apparent from the following description when considered in conjunction with the drawings. The following description, given by way of example, but not intended to limit the invention solely to the specific embodiments described, may best be understood in conjunction with the accompanying drawings, in which:

FIG. 1 illustrates a medical imaging system utilizing an embodiment of the present invention;

FIG. 4 shows an example of rays cast through a cavity according to an embodiment of the present invention;

FIG. 7 shows a schematic representation of a distribution of samples along a ray according to an embodiment of the present invention;

FIG. 8 shows a schematic representation of partitions created from ray samples according to an embodiment of the present invention;

FIG. 9 shows an algorithm for fast rendering during melt-through according to an embodiment of the present invention;

FIG. 10 shows an algorithm for cumulative composition for translucent transfer functions according to an embodiment of the present invention;

FIG. 11 shows a schematic representation of partitions created from ray samples for a translucent transfer function according to an embodiment of the present invention;

FIG. 14 shows a schematic representation of incremental updates when the clipping plane changes.

DETAILED DESCRIPTION OF EXEMPLARY EMBODIMENTS

Figure 2:
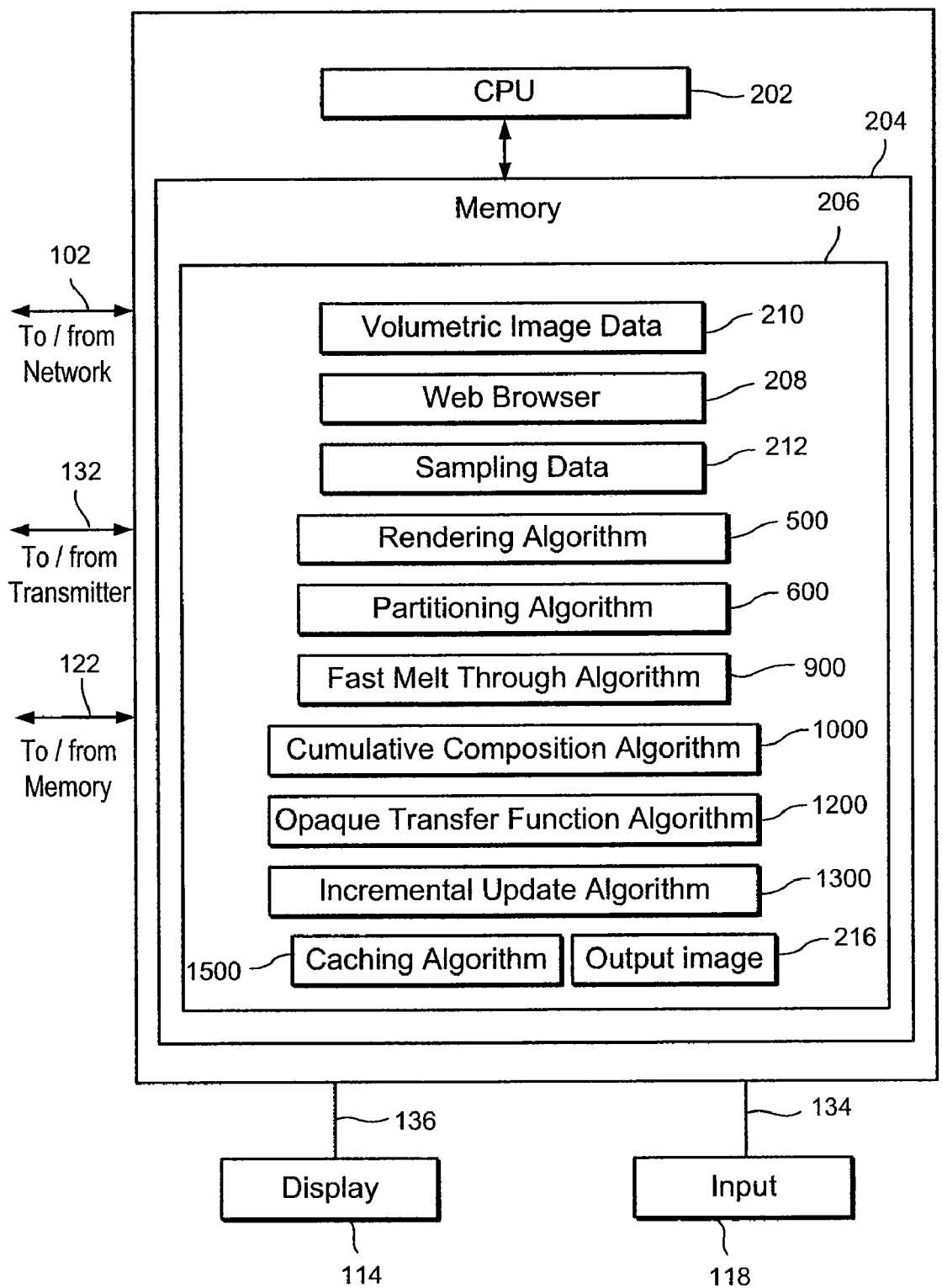
FIG. 2 illustrates a processing apparatus that may be used with an embodiment of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Turning to the drawings, wherein like reference numerals refer to like elements, an embodiment of the invention is illustrated as being implemented in a suitable computing environment. Although not required, an embodiment of the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that embodiments of the invention may be practiced with other computer system configurations, including hand-held devices, multi-processor systems, microprocessor based or programmable consumer electronics, network PCs, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices. In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while an embodiment of the invention is being described in the foregoing context, it is not meant to be limiting as those of skill in the art will appreciate that various of the acts and operation described hereinafter may also be implemented in hardware.

The embodiments of the present invention are readily applied, for example, to x-ray imaging in general, CT imaging, PET imaging, and fluoroscopic imaging, which utilize low dose x-rays per image.

By using partitions with partial or cumulative compositions it is possible to increase the frame rate for ray-casting by more than ten times. Partial composition is useful in situations where pre-processing time is limited or not readily available. Because of early ray-termination, not all partitions on each ray are used for each frame. Not all partitions need to be evaluated at the beginning. An embodiment of the present invention enables generation of the composition for the remaining partitions when required for a particular frame. On the other hand, cumulative composition gives faster results because there is no need to composite the different partitions. However, during the pre-processing stage, the rays are shot until the end (i.e., no early ray-termination), and hence it has a higher pre-processing cost. Medical datasets frequently have significant amounts of voxels with zero opacity. By storing the first hit position of a non-empty voxel for each ray, further improvements in the melt-through speed are achieved.

Embodiments of the present invention enable reuse of the rendering of the previous frame for small movements of the clipping plane, when there is no partition boundary available in the immediate neighborhood of the plane.

As stated previously, an embodiment of the invention presents a method of increasing the speed of a ray-casting algorithm for producing direct volume rendering images in the melt-through interaction mode. Since the viewing direction is not changed during a melt-through interaction, it is possible to reuse the samples calculated along each ray from one frame to another. The samples along each ray are partitioned into different groups, and the samples within each partition can be composited to generate a Red Green Blue and Alpha (RGBA-tuple, which is an opacity factor) for the partition. The associative property of the composition operation allows computation of the final RGBA value for each ray by compositing the RGBA-values of the partitions, instead of compositing the RGBA-values of each sample along the ray. Also disclosed are two different modes of compositing, which may be selected based on their preprocessing and rendering speeds. Two optimizations for rousing values from renderings of previous frames are disclosed.

Utilizing the above-mentioned enhancements, a substantial increase, in excess of ten-fold, in the melt-through performance of an image may be achieved. The images are typically generated by an imaging device (discussed above) that generates volumetric data that includes a plurality of voxels.

A voxel ("volumetric pixel" or 3D pixel) is a volume element, representing a value on a regular grid in three dimensional space. Voxels are analogous to pixels, which represent 2D image data. Voxels are frequently used in the visualization and analysis of medical and scientific data. Some true 3D displays use voxels to describe their resolution. For example, a display might be able to show 512×512×512 voxels. As with pixels, voxels themselves typically do not contain their position in space (their coordinates); but rather, their coordinates are inferred based on their positions relative to other voxels (i.e., their positions in the data structure that makes up a single volume image). The value of a voxel may represent various properties. In CT scans, the values are expressed in Hounsfield units, representing the opacity of an imaged material to x-rays. Different units are used for MRI and ultrasound.

When using a technique such as ray casting, upon examination of the resulting image, there are regions which are uniform and there are regions which contain a substantial quantity of high frequency changes. One approach used to exploit this property is called image-space adaptive refinement, which includes sampling the rays on a large sparse grid (8×8). Each grid is divided into 4×4 grids and a determination is made whether to cast more rays or merely perform 2D interpolation for the 4×4 grid points by comparing the difference of the previously rendered rays on the 8×8 grid. The process is repeated until the pixel level, or a pre-specified stop level, is reached.

An embodiment of the present invention may be used in any ray casting algorithms for Direct Volume Rendering (DVR), Maximum/Minimum Intensity Projection (MaxIP/MinIP), and other similar applications. For example, high performance with relatively high quality image can be achieved for interactive mode rendering of the dataset (512×512×4096) without using any special graphics hardware for acceleration.

FIG. 1 illustrates a medical imaging system 100 utilizing an embodiment of the present invention. Medical imaging system 100 includes a processing device 108, a display module 114, an input module 118, a transmitter module 110, remote storage module 122, network 120, patient 106, examination table 104, and receiver unit 170.

A patient 106 is supported by table 104. Transmitter unit, or module, or emitter unit, or module, 110 and receiver unit, or module, or detection unit, or module, 170 produce image data related to a patient 106. The transmission unit 110 generates imaging medium 130, which may be x-rays, positrons, high-frequency sound waves (ultrasound), or other imaging medium. The transmission unit 110 may be, for example, an x-ray emitting unit, such as an x-ray tube, and receiver unit 170 may be, for example, an x-ray detecting unit, such as an x-ray detector.

In an x-ray embodiment, the emitting unit, or module, 110 is adapted to emit x-rays 130 (identifying a plurality of x-ray signals) and may be, for example, an x-ray producing device that includes a source of electrons, a vacuum within which the electrons are accelerated, and an energy source that causes the electrons to be accelerated. The detection unit, or module, 170 is adapted to absorb and measure the emitted x-rays.

The imaging process may also be implemented using Computed Tomography (CT), originally known as computed axial tomography (CAT or CT scan), which uses digital geometry processing to generate a three dimensional image of internal features of an object from a large series of two-dimensional x-ray images taken around a single axis of rotation. An iodine dye, or other contrast material, may be used to make structures and organs easier to see on the CT pictures. The dye may be used to check blood flow, find tumors, and examine other problems or areas of interest. Positron emission tomography (PET) imaging may also be used. In PET imaging, a short-lived radioactive tracer isotope, which decays by emitting a positron, and which typically has been chemically incorporated into a metabolically active molecule, is injected into the patient. The radioactive decay of positrons is measured to generate an image.

Transmitter unit, or emitting unit, 110 and receiver unit, or detection unit, 170 are coupled to processor unit 108 via communication media 132(a) and 132(b), respectively, which are used to provide image data to processing unit 108. Communication media 132 (generally) are, for example, a USB bus, IEEE bus or other bi-directional communication medium that is capable of transmitting data, typically representing a one or more images in an electronic format.

Processor unit 108 is typically a system control unit that controls the operation of the entire system 100, performs image processing, and transmits the image data for display on the image display unit 114. Processor unit 108 typically includes a CPU and memory to perform the necessary data processing and storage functions for system 100.

Processing unit, or device, or module, or terminal, 108 is typically one or more computers, or other processing device(s), wireless processing device, personal computer (PC), desktop, notebook, information appliance and the like. The processing device typically includes processing and storage modules.

The image display unit, or module, 114 is coupled to processor unit 108 via bidirectional communication medium 136, which is typically a bus or wired connection or wireless connection. The display unit 114 is used to display the image data generated by the system 100. The display unit 114 may be, for example, a monitor, liquid crystal display (LCD), a plasma screen, a graphical user interface (GUI) or other module adapted to display output data typically by a representation of pixels. Input module 118 is coupled to processing unit 108 via bidirectional communication medium 134, which is typically a bus or wired connection or wireless connection. The input module 118 may include devices such as a keyboard, mouse, track ball and/or touch pad or any combination thereof.

The image display module 114 may be coupled to another CPU, processor, or computer, such as a desktop computer, or a laptop computer (not shown), and may also be coupled to a keyboard, a mouse, a track ball, or other input device (not shown) and may also have control mechanisms, such as mechanisms to adjust the view, dimensions, color, font, or display characteristics. The processing module 108 may also be coupled to a printer (not shown) to print the output, or a transmission module, such as a DSL line (not shown) or a modem, such as a wireless modem (not shown), to transmit the output to a second location or another display module. This transmission may also be accomplished using a network, such as the Internet, with web browsing capability, or other network of operatively coupled computers, processors, or output devices. One example of a network is shown in FIG. 1 as element 120.

The network 120 is, for example, any combination of linked computers, or processing devices, adapted to transfer (transmit and/or receive) and process data. The network 120 may include wireless and wired transmission capabilities. The network 120 may be a private Internet Protocol (IP) network, as well as a public IP network, such as the Internet that can utilize World Wide Web (www) browsing functionality. Alternatively the network 120 may be an Ethernet network, or any two or more operatively coupled processing devices that can share information.

An example of a wired network is a network that uses communication busses and MODEMS, or DSL lines, or a local area network (LAN) or a wide area network (WAN) to transmit and receive data between terminals (such as processor 108 and memory 122). An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems which enables connection to the Internet or other machines that have Wi-Fi functionality. Wi-Fi networks broadcast radio waves that can be picked up by Wi-Fi receivers that are attached to different computers. As shown in FIG. 1, the network 120 is coupled to processing device 108 via wired or wireless bi-directional communication medium 102.

Memory module 122 is an electronic storage medium, such as a server, or other electronic storage repository that can store data used by system 100. The memory module 122 may include, for example, RAM, ROM, EEPROM or other memory media, such as an optical disk, optical tape, CD, or a floppy disk, a hard disk, or a removable cartridge, on which digital information is stored in the form of bits. The memory module 122 is shown as remote memory coupled to processing module 108 via wired or wireless bidirectional communication medium 112.

FIG. 2 illustrates a processor module 108 that may be used with an embodiment of the present invention. Processor module 108 includes a CPU 202 and memory 204. Also shown in FIG. 2 are the bi-directional communication media 102, 112 and 132. Display module 114 and input module 118 and associated communication media 136 and 134, respectively, are also shown.

The CPU 202 is typically a processor that includes an arithmetic logic unit (ALU), which performs arithmetic and logical operations, and a control unit (CU), which extracts instructions from memory and decodes and executes them, utilizing the ALU when necessary.

Memory module 204 is typically an electronic storage medium such as RAM, ROM, EEPROM or other memory device, such as an optical disk, optical tape, CD, or a floppy disk, a hard disk, or a removable cartridge, on which digital information is stored in the form of bits. It may also include recorders to record to and read from mass storage devices such as, for example, optical disks, magnetic disks, flash semiconductor disks, and other types of storage which may be temporary or permanent.

The memory module 204 stores programs 206, which include, for example, a web browser 208, image data storage 210, sampling data storage 212, rendering algorithm storage module 500, partitioning ray sample algorithm storage module 600, fast rendering melt-through algorithm storage module 900, composition for translucent transfer algorithm storage module 1000, opaque transfer algorithm storage module 1200, update rendering algorithm storage module 1300 and first-hit position algorithm storage module 1500 as well as typical operating system programs (not shown), input/output programs (not shown), and other programs that facilitate operation of processing device 108.

Memory module, or facility, 204 is used to store image data either received from the detecting unit (shown as element 170 in FIG. 1) or generated by the CPU 202, based on data received from the detecting unit or other source, such as a remote memory (element 122 in FIG. 1), or network (element 120 in FIG. 1). The memory 204 may be accessed in such a way that the contents of the memory are provided to the CPU 202 and/or system controller 108. Once the data has been accessed, typically by program code to fetch, or retrieve, the desired data stored in memory, it may be processed according to one or more algorithms described here.

Web Browser 208 is an algorithm that provides World Wide Web (www) browsing functionality, for example, any ISP (Internet Service Provider) compatible program. Image data storage module 210 stores image data, such as medical image data obtained from an imaging technique, such as CT, PET, ultrasound, or other image data having a pixel representation. This data may be a volumetric representation formed by a configuration of voxels. Data module 212 is used to stored image data, which may be sampled image data. The image data is typically generated from ray casting algorithms or other technique. Algorithm modules 500, 600, 900, 1000, 1200, 1300 and 1500 are used to store algorithms, or series of steps, or program code for determining components of embodiments of the present invention, such as a raycasting, partitioning ray samples for fast melt-through, fast rendering during melt-through, cumulative composition for translucent transfer, opaque transfer functions, incremental updates, caching first hit position (each of which described in more detail herein). These modules, when operated in conjunction with a processor are a structural element. Output image module 216 is used to store an output image data generated by the algorithm. The output image may be stored, transmitted, printed, displayed or otherwise utilized.

Volumetric data, which comprises voxels having nodes in an octree, may be used to generate a 2D image, which may be configured so that a user may melt-through to a desired position in the voumetric data. Each node in an octree subdivides the space it represents into eight subspaces (octants). In a point region (PR) octree, each node stores an explicit 3-dimensional point, which is the "center" of the subdivision for that node; the point defines one of the corners for each of the eight children. In an MX octree, the subdivision point is implicitly the center of the space that the node represents. The root node of a PR quadtree can represent infinite space; the root node of an MX octree represents a finite bounded space so that the implicit centers are well-defined.

As described above, it is possible to subdivide an image into small blocks, for example 8×8 blocks. Using a raycasting technique, rays may be cast, or shot, at the grid points of the block and a comparison is made of the four ray values to determine the maximal difference among the sampling rays on the grid points. If the difference is greater than a pre-defined threshold, it indicates that there is possible high-frequency information inside this image block. The pre-defined threshold may be pre-calculated and retrieved from memory, or may be determined in substantially real time.

Therefore, a sub-division of the block is performed and additional rays are cast, or shot, on the grid points of the sub-divided blocks.

If the difference is less than a pre-defined threshold, the block is deemed to be a homogeneous region and therefore a 2D interpolation is adequate to fill in the pixel values inside the block.

In a ray-casting algorithm, the final color at each pixel of the rendering window is generated by shooting a (virtual) ray from the camera through the pixel. As the ray passes through the object, data samples are taken, converted to color (RGBA), possibly shaded using lighting equations, and composited in depth-order to get the final color. This process is repeated for rendering each new frame. If a clipping plane is used, samples are only taken on the part of the ray which is not clipped by the clipping plane.

Volume rendering algorithms typically have one main feature that differentiates melt-through interaction from normal three-dimensional interaction. In melt through, the user does not rotate the object. In terms of the object space coordinate system, this implies that the (virtual) camera is always looking in the same direction, whereas in a normal interactive scenario, the camera viewing direction changes with the changing rotation of the object.

Figure 3:
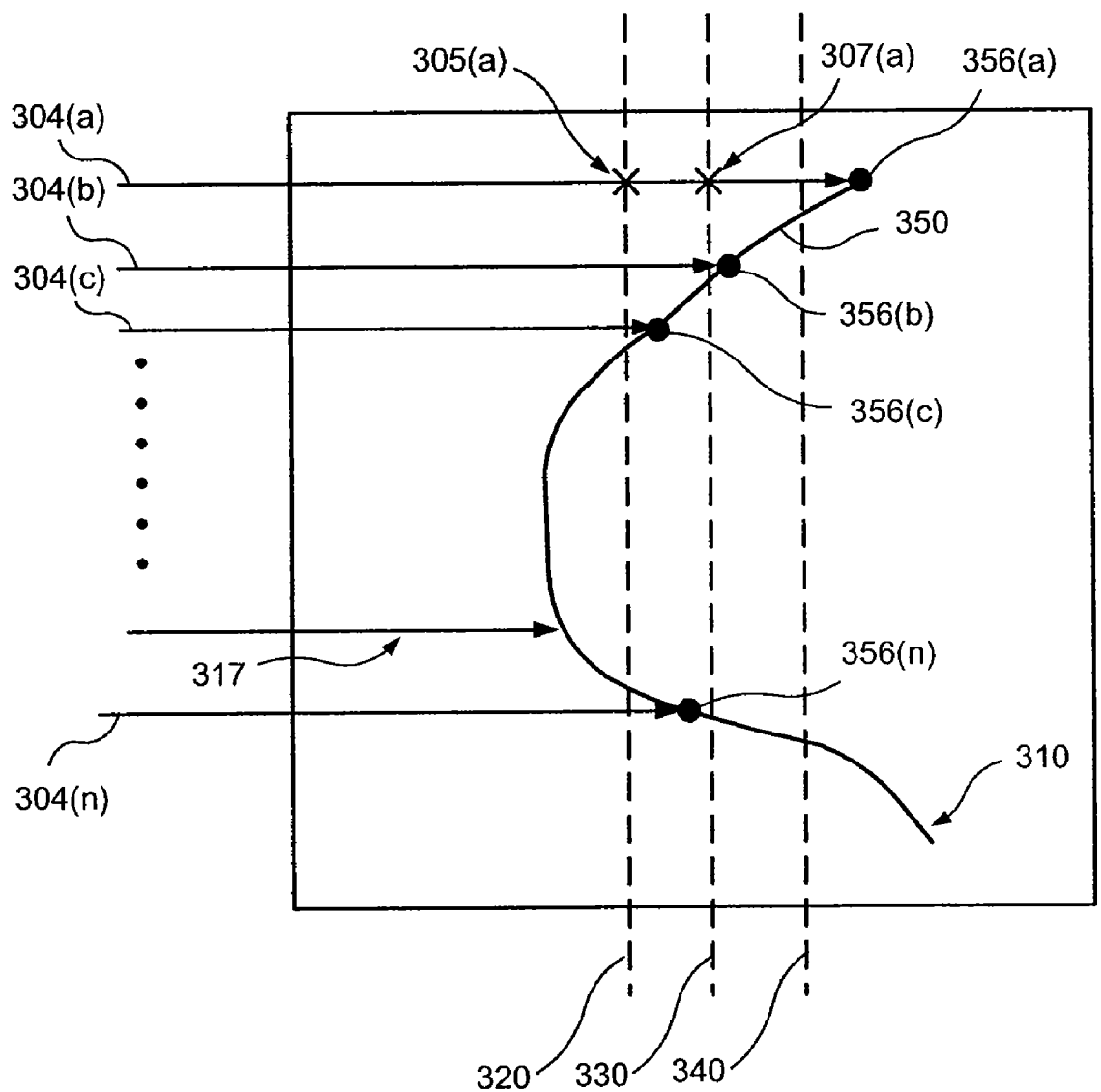
FIG. 3 shows an example of a grid with rays according to an embodiment of the present invention.

FIG. 3 shows a representation 300 of a voxel space with rays. As shown in FIG. 3, rays 304(a) through 304(n) (where n is any suitable number) are cast through a voxel space 317 toward a solid object 310. A volumetric grid is established over the voxel space and vertical grid lines 320, 330, and 340 are shown. As shown in FIG. 3, ray 304(a) intersects with lines 320, 330, and 340 as it passes through the voxel space. Specifically, ray 304(a) intersects vertical grid line 320 at intersection 305(a). Ray 304(a) also intersects vertical grid line 330 at intersection 307(a). At intersections 305(a) and 307(a), the ray 304(a) is traveling through voxels representing empty space in voxel space 317. Ray 304(a) also intersects vertical grid line 340 at intersection 356(a). Intersection 356(a) represents the point at which ray 304(a) strikes voxels representing a portion of solid object 310. Similarly, ray 304(b) strikes solid object 310 at point 356(b). Ray 304(c) strikes solid object 310 at point 356(c). Thus, as rays pass through empty voxel space, the ray sampling data for rays in the empty voxel space may be reused, thereby increasing the speed of a rendering. Once an object is detected, i.e., ray 304(c) in the region between regions 330 and 340, additional sampling is performed to accurately identify the structure of object 310.

FIG. 4 shows a representation 400 of a voxel space 417 and a plurality of rays 404(a) . . . (n) (where n is any suitable number) that are passed through the voxel space 417. As shown in FIG. 4, the voxel space 417 has gridlines and intersecting gridpoints. A body with a body cavity 410, shown roughly in the middle of the voxel space 417, is also shown in FIG. 4. Body cavity 410 is the only portion of the representation of the voxel space 400 that is not solid. In this example, ray 404(b) intersects body cavity at point 456. Between point 456 and 460, the sample for ray 404(b) may be reused since the cavity is empty space. The ray 404(b) will again be sampled as it leaves the cavity 410 after point 460. A similar situation exists for ray 404(c) between points 458 and 462 and ray 404(d) between points 464 and 466. When the ray re-enters the solid object, the ray may be sampled at a greater frequency. In this example, the rays will be in body cavity 410 for a shorter period of time and may be sampled at a lower frequency while it pass through body cavity 410 since it is a cavity and not a solid object.

Based on the model for volume rendering, the composition along each ray can be implemented with equation (1) below. Along each ray, the samples can be composited in a front-to-back order, back-to-front order, or a combination of both. The samples are not reordered—a sample is composited with a sample next to it. The compositing is done for each of the channels RGB independently, but using the same equations. For example, if the ith sample in a ray has the colors $(r_i, g_i, b_i, a_i)$, where $1 \leq i \leq n$. The equation for the red-channel is provided as an example. For each sample, the alpha-weighted color, $c_i = r_i a_i$, and the transparency, $t_i = 1 - \alpha_i$. Assuming the background color is given by $c_{bg} = r_{bg}$ then, for this ray, the pixel color is obtained by the following compositing equation:

$$C = c_1 + t_1 \cdot \qquad (1)$$
$$(c_2 + t_2 \cdot (c_3 + t_3 \cdot (c_4 + \ldots t_{n-2} \cdot (c_{n-1} + \ldots t_{n-1} \cdot (c_n + t_n \cdot (c_{bg}))))))$$
$$= c_1 + (t_1 \cdot c_2) + (t_2 \cdot t_1 \cdot c_3) + (t_3 \cdot t_2 \cdot t_1 \cdot c_4) + \ldots +$$
$$(t_{n-2} \ldots t_3 \cdot t_2 \cdot t_1 \cdot c_{n-1}) + (t_{n-1} \cdot t_{n-2} \ldots t_3 \cdot t_2 \cdot t_1 \cdot c_n) + \ldots +$$
$$(t_n \cdot t_{n-1} \cdot t_{n-2} \ldots t_3 \cdot t_2 \cdot t_1 \cdot c_{bg})$$

This composition can be expressed in terms of an over operation. which is associative (but not commutative). So, equation (1) becomes:

$$C = c_1 \text{over}_{c_2} \text{over}_{c_3} \text{over}_{c_4} \text{over} \ldots \text{over}_{c_{n-1}} \text{over}_{c_n} \text{over}_{c_{bg}} \qquad (2)$$

Figure 5A:
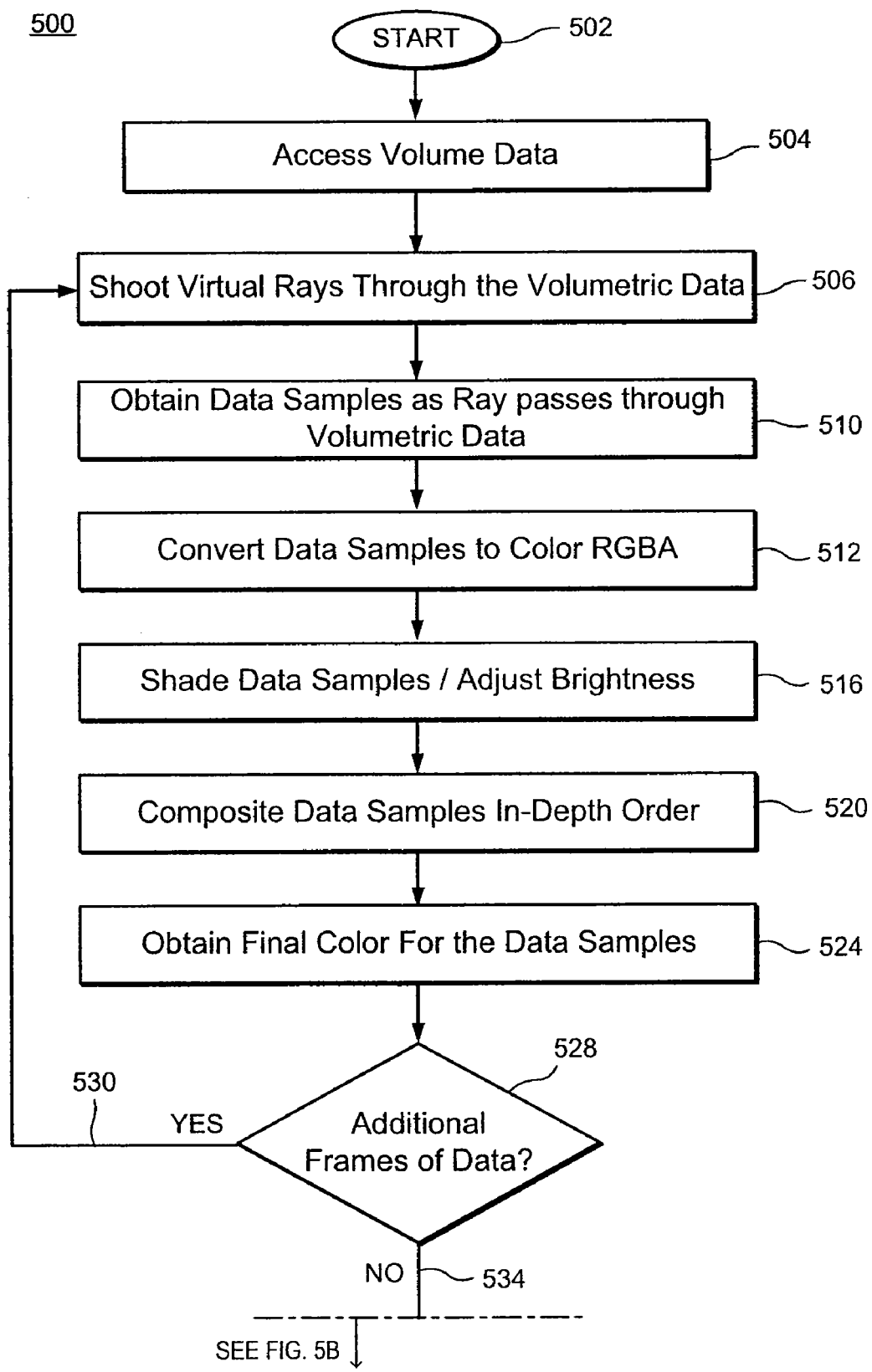
FIG. 5 shows a flowchart of steps to render an image according to an embodiment of the present invention.
Figure 5B:
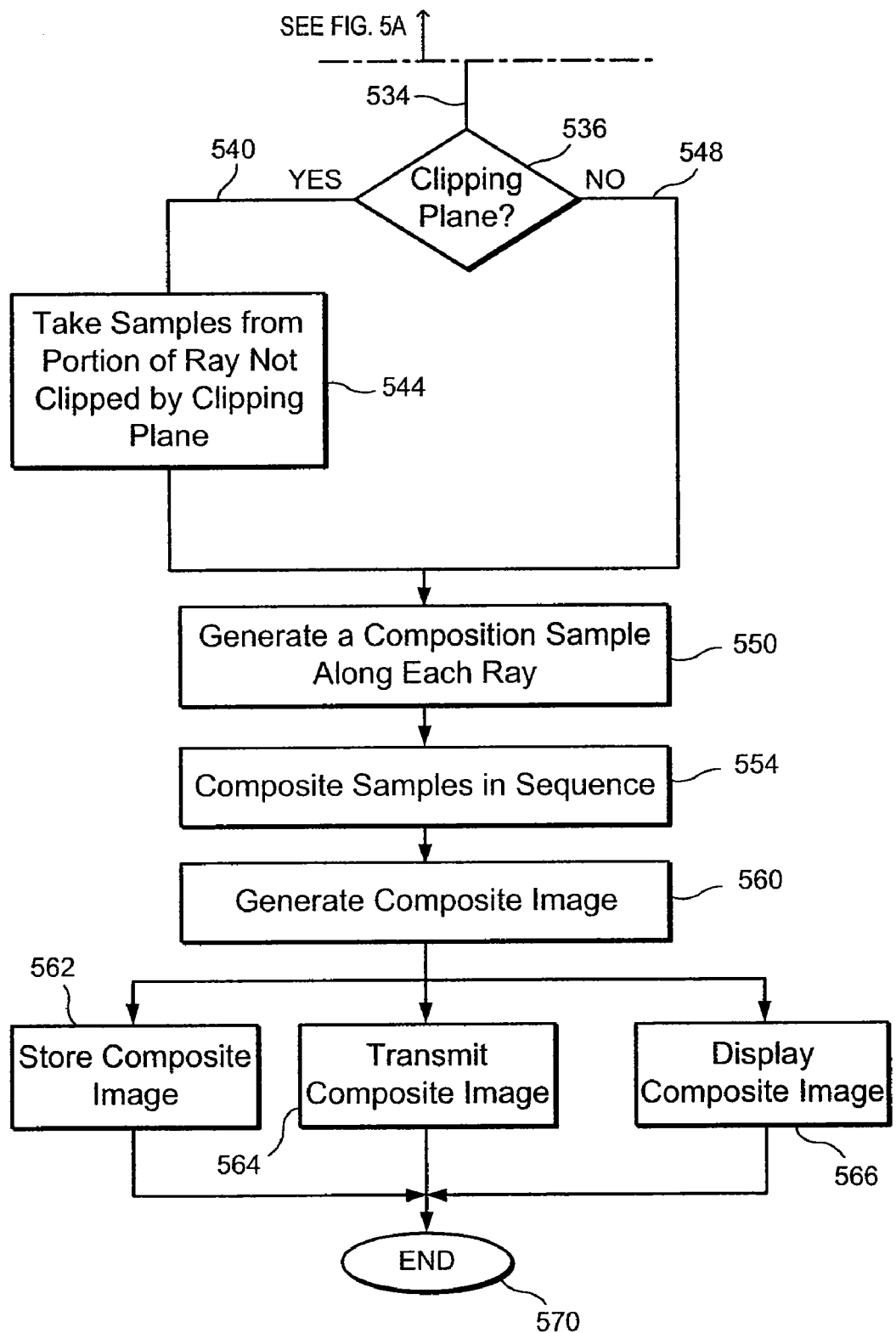

FIG. 5 shows a flowchart 500 of steps to cast rays and thereby render an image according to the present invention. The steps 500 may be executed by a processor, or otherwise executed to perform the identified functions and may also be stored in one or more memories. For example, the steps of FIG. 5 may be stored on a computer-readable medium, such as ROM, RAM, EEPROM, CD, DVD, or other non-volatile memory. The algorithm begins with start step 502. Volumetric data is accessed, as shown in step 504. The volumetric data is typically generated by an imaging device or technique described above and is 3D representation comprised of voxels. Rays are then shot through a volumetric data, as shown in step 506. Data samples are then obtained as the ray passes through the object, as shown in step 510. Data samples are then converted to color RGBA, as shown in step 512. The data samples are then shaded using lighting equations, as shown in step 516. The shaded samples are then composited in depth order, as shown in step 520. The final color for the samples is then obtained, as shown in step 524. A determination is made whether there are additional frame data, as shown in decision step 528. If additional frame data is present, "yes" line 530 shows that additional rays are cast, as shown in step 506. The above-described process is then repeated, as necessary to obtain the sample data.

If additional frame data is not needed, then "no" line 534 leads to a determination of whether a clipping plane is used, as shown in step 536. If a clipping plane was used, "yes" line 540 shows that samples from the portion of each ray not clipped by the clipping plane are taken, as shown in step 544. The composition along each ray is then calculated using a composition algorithm, as shown in step 550. This algorithm may, for example, be equation (1) discussed herein.

If it is determined, as shown in step 536 that a clipping plane was not used, "no" line 548 leads to step 550 which shows that a composition along each ray is calculated. This composition calculation is described in relation to equation (1) above. The samples are composited in order, or sequence, as shown in step 554. The samples may be composited in order from front-to-back or back-to-front. The samples may also be composited in a combination of front-to-back and back-to-front fashions. A composite image is then generated, or rendered, as shown in step 560. The image rendering results in a 2D image. The composite image may be stored, as shown in step 562, and/or transmitted to another location, as shown in step 564, and/or displayed, as shown in step 566. The algorithm 500 ends, as shown in step 570.

Partitioning Ray-Samples for Fast Melt-Through

As mentioned previously, during melt-through, there is no rotation of the object, and hence the same camera rays can be used for rendering each frame. This holds true irrespective of the projection type—perspective or orthographic. For each ray, the same samples can be reused from one frame to another. The only change from one frame to the next is the position of the clipping plane, which results in a different set of samples being clipped each frame. If, during the first frame, the ray-samples are cached for each ray, then subsequent frames can be rendered from the samples without retrieving the actual data. However, this sample list can require a large memory footprint, which makes the method unsuitable. To improve the speed of the melt-through mode rendering, but without requiring a high memory overhead, it is possible to create partial compositing results from the ray samples. One embodiment is as follows:

When the melt-through interaction is turned on, samples along each ray are computed. Optimizations such as empty space leaping and adaptive sampling distance can be used, which result in a sample sequence of smaller size. This is illustrated in FIG. 7. For each ray, the sample sequence is divided into a plurality (m) partitions, such that each partition has (d) samples. The partitioning is independent for each ray, and the partition size can vary within a ray depending on the empty space and the sampling rate used within a particular partition. All of the individual samples within each partition are composited together, yielding an RGBA-tuple. For example, suppose the samples (i, 1+1.j) fall in the mth partition (FIG. 8). Here, j=i+d−1. Then, the composited color and transparency for the mth partition is:

$$C_m = c_i + t_i \cdot \\ (c_{i+1} + t_{i+1} \cdot (c_{i+2} + t_{i+2} \cdot (c_{i+3} + \ldots t_{j-2} \cdot (c_{j-1} + \ldots t_{j-1} \cdot (c_j) \ldots )) \\ = c_i \text{ over} (c_{i+1} \text{ over} (c_{i+2} \text{ over}(c_{i+3} \text{ over} \ldots \text{ over}(c_{-1} \text{ over} c_j) \ldots )) \quad (3)$$

$$T_m = t_i \cdot t_{i+1} \cdot t_{i+2} \ldots t_{j-2} \cdot t_{j-1} \cdot t_j \quad (4)$$

When rendering in melt-through mode, for each ray, the RGB colors and transparency values of each partition, as defined in equations (3) and (4) are stored. The starting sample number for each partition is also stored. For partition m, the information $(C_m, T_m, i)$ are stored. It is now possible to create a usual DVR rendering using these stored values—instead of compositing the RGBA values of the samples along the ray as shown in equation (2), it is possible to composite the stored RGBA values of the partitions. So, the compositing in equation (1) can be rewritten as:

$$C = c_1 \text{over}_{c_2} \text{over}_{c_3} \text{over} \ldots \text{over}_{c_{M-1}} \text{over}_{c_M} \text{over}_{c_{bg}} \quad (5)$$

Because of the associativity property, both equations (2) and (5) will yield the same results.

Figure 6:
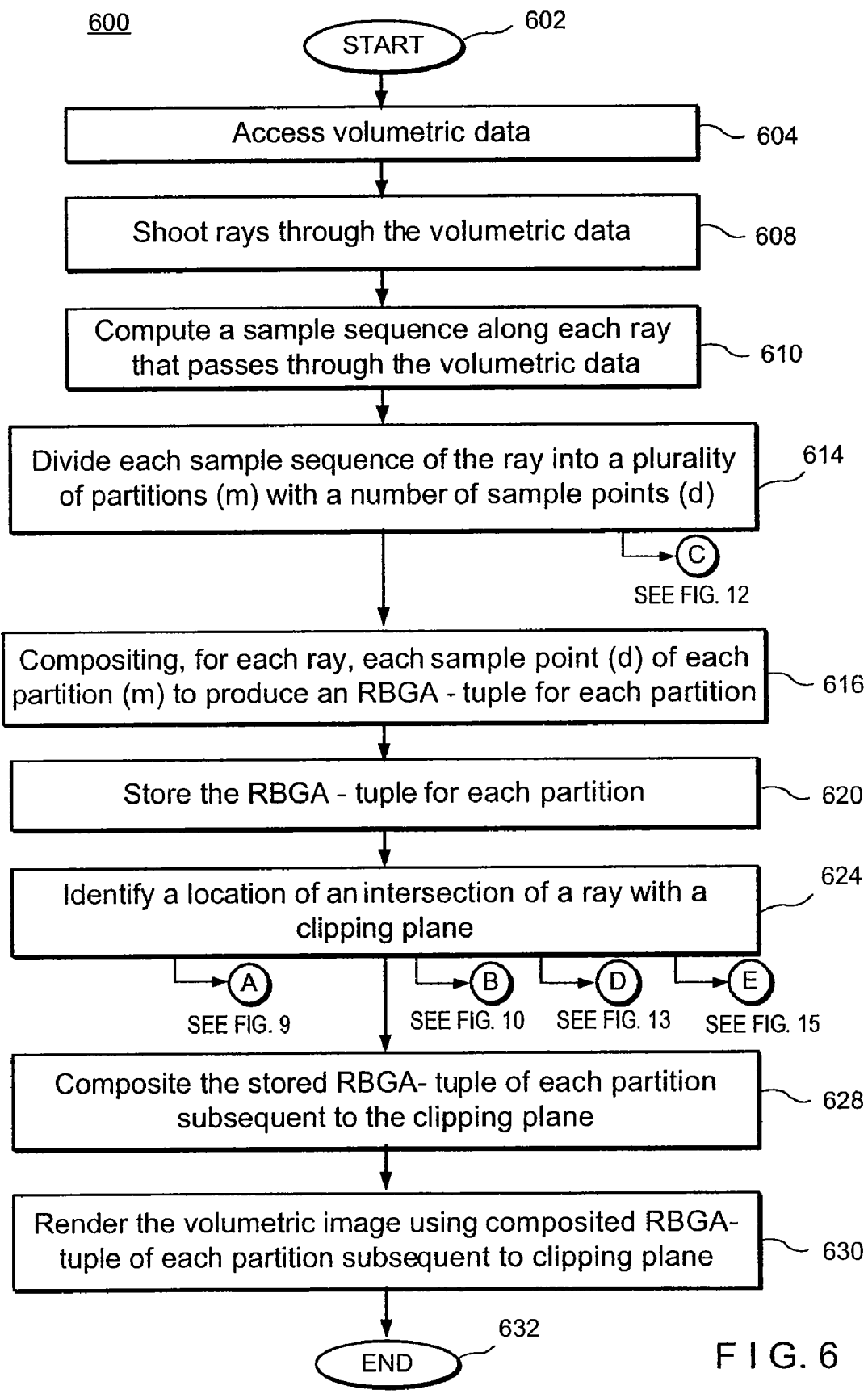
FIG. 6 shows a flowchart of steps to partition ray-samples for fast melt-through according to an embodiment of the present invention.

FIG. 6 shows a flowchart 600 of steps to partition rays for fast melt-through. The steps 600 may be executed by a processor, or otherwise executed to perform the identified functions and may also be stored in one or more memories. For example, the steps of FIG. 6 may be stored on a computer-readable medium, such as ROM, RAM, EEPROM, CD, DVD, or other non-volatile memory. The algorithm begins with start step 602. Volumetric data is accessed, as shown in step 604. Virtual rays are then shot through the volumetric data, as shown in step 608. As each ray passes through the volumetric data, a samples sequence along each ray is computed, as shown in step 610. Samples may then be optimized. Each sample sequence of the ray is divided into a plurality of partitions (m), each of the m partitions having sample points (d), as shown in step 614. (Element C is a further embodiment described in relation to FIG. 12.) Individual sample points (d), for each ray, of each partition (m) are then composited, to generate an RBGA-tuple for each partition, as shown in step 616. The RGBA-tuple for each partition is then stored, as shown in step 620. The RGBA tuples may be calculated in accordance with an algorithm, such as algorithms 3 and 4 described herein. The location of an intersection of a ray with a clipping plane is identified, as shown in step 624. (Elements A, B, D and E are additional embodiments described in relation to FIGS. 9, 10, 13 and 15, respectively.) The stored RGBA values of each of the partitions subsequent to the clipping plane are then composited, as shown in step 628. The image data is then generated, or rendered, using the composited RBGA-tuple of each partition that is subsequent to the clipping plane, as shown in step 630. The image data may then be displayed, and/or stored, and/or transmitted. The algorithm is then terminated at end step 632.

FIG. 7 shows a schematic representation 700 of a distribution of samples along a ray 710 according to the present invention. The sampling rate determined and adjusted so that it varies between in different portions of the ray, described as partitions m, herein. For example, region 702 has a low sampling rate as illustrated by the relatively low density of the three sampling points 712, 714, and 716. (Sampling points 712, 714 and 716 are referred to as d herein.) Region 704 consists of empty space; consequently, no sampling needs to be taken along region 704. Thus, there are no sampling points in that region and d is zero. The ability to take zero samples is defined by the transfer function. Region 706 has a high sampling rate, as indicated by the density of sampling points 718, 720, 722, 724, and 726.

FIG. 8 shows a schematic representation 800 of the partitions created from ray samples, with two samples in each partition. A partition starts at the location of the first sample in the partition, and ends before the first sample of the next partition. For example, as shown in FIG. 8, partition 802 may be defined by $C_1$, $T_1$ and contains samples 712 and 714. Partition 804 may be defined by $C_2$ $T_2$ and contains samples 716 and 718. Partition 810 may be defined by $C_3$, $T_3$ and contains samples 720 and 722. Partition 812 may be defined by $C_4$, $T_4$ and contains samples 724 and 726.

Fast Rendering During Melt-Through

During the melt-through mode rendering, the ray-casting algorithm remains the same except that only those ray-samples which are not clipped by the clipping plane are used during compositing. From the previous example, assume that the samples (i, i+1 . . . 0.1) fall in the mth partition. Assume the samples (1, 2, k), where i 5k<j, are clipped by the plane. Then, the pixel color is computed as (compare to equation (2)):

$$C = c_{k+1} \text{over}_{c_{k+2}} \text{over} \ldots c_j \text{over}_{c_{j+1}} \text{over}_{c_{j+2}} \text{over} \ldots \\ c_{n-1} \text{over}_{c_n} \text{over}_{c_{bg}} \quad (6)$$

In the present invention, if a partition is not clipped by the clipping plane, substitute all the samples lying within a partition by the color and transparency values of that partition as given by equations (3), (4) and (5). If the clipping plane intersects a partition, i.e., if one or more samples in a partition are clipped by the clipping plane, then the stored values are not used for that particular partition. Instead, computing the samples (only in the part of the ray not clipped) is achieved by looking up their RGBA values and compositing them together. Once all the non-clipped samples of this partition have been composited, it is possible to composite the resulting RGBA value with the stored RGBA values of all other partitions. Continuing the example from equation (6), the compositing equation is given by:

$$C = c_{k+1} \text{over} c_{k+2} \text{over} \ldots c_j \text{over} c_{m+1} \text{over} c_{m+2} \text{over} \ldots c_{M-1} \text{over} c_M \text{over} c_{bg} \quad (7)$$

By comparing equations (6) and (7), it can be seen that there is a savings, for each frame, of the calculation of sample values (including time for data access, trilinear interpolation, color lookup etc.). There is also a reduction in the number of composition operations performed in equation (6) by a factor equal to d—the average number of samples in each partition.

However, the enhancement described above may not maximize the improvement of the rendering speed for large datasets, especially for large rendering window sizes of the order 1 k×1 k. Embodiments of this invention also include further improvements to the above-described algorithm that increase the performance of the system.

FIG. 9 shows a flowchart 900 (element A shown in FIG. 6) of steps to partition rays for fast melt-through. The steps 900 may be executed by a processor, or otherwise executed to perform the identified functions and may also be stored in one or more memories. For example, the steps of FIG. 9 may be stored on a computer-readable medium, such as ROM, RAM, EEPROM, CD, DVD, or other non-volatile memory. The steps of the algorithm, when executed by a processor provide structure for the functional steps recited. The algorithm 900 may be used as an additional embodiment to the embodiment described in relation to FIG. 6. Algorithm 900 shows that a partition that the clipping plane cuts through is identified, as shown in step 902. Sample points (d) that are located from the intersection of the ray and the clipping plane (ray-clipping plane intersection) to the beginning of the next partition are interpolated and composited, as shown in step 904. Thus, the partition may contain composited samples from the beginning of the partition to the beginning of the next partition. Also, the partition may contain composited samples from the beginning of the partition to the end of the ray. Step 906 shows that algorithm 900 ends.

Cumulative Composition for Translucent Transfer Functions

The above-described technique reduces the per-frame computation for the melt-through interaction. For highly translucent transfer functions, however, the speed is not fast enough since in such cases, empty space leaping and early ray termination are not effective. As a consequence, the rays are very long, which necessitate a large number of samples to be taken. For a given d (number of samples per partition), there are a large number of partitions for each ray. Thus the memory footprint increases, and there are more terms to be composited in equation (7).

It is an embodiment of the present invention to reduce the computation by storing, for each partition, the composited color of all the samples from the beginning of that partition until the end of the ray. In other words, the color and transparency values are obtained by the composition of all the samples within the particular partition and beyond, including the last partition (see FIG. 11). As mentioned previously, the example for equation (3)—the samples (i, i+1, . . . , i+k) fall in the jth partition. Then, the color, $\check{C}j$ stored in the jth partition is:

$$\check{C} = c_i \text{over} c_{i+1} \text{over} c_{i+2} \text{over} c_{i+3} \text{over} \ldots \text{over} c_{n+1} \text{over} c_n \quad (8)$$

$$\check{T} = t_i \cdot t_{i+1} \cdot t_{i+2} \ldots t_{n-1} \cdot t_{n-1} \cdot t_n \quad (9)$$

FIG. 10 shows a flowchart 1000 (element B shown in FIG. 6) of steps to composite ray samples for fast melt-through and thereby efficiently render a 2D image that can be effectively manipulated to produce a melt-through function. (The steps of FIG. 10 are an additional embodiment to the method described in relation to FIG. 6.) The 2D rendering is derived from volumetric data obtained by any suitable imaging technique. The steps 1000 may be executed by a processor, or otherwise executed to perform the identified functions and may also be stored in one or more memories. For example, the steps of FIG. 10 may be stored on a computer-readable medium, such as ROM, RAM, EEPROM, CD, DVD, or other non-volatile memory.

Unclipped samples located before the front-most visible partition are composited with the color stored in that partition, as shown in step 1002. The unclipped samples located before the front-most visible partition are then composited with the background, as shown in step 1004. The algorithm is then terminated at end step 1006.

An example of the partitioning aspect of the present invention is now described. In a partition j, the tuple ($\check{C}_j$, $\check{T}_j$, i) is stored. During melt-through rendering, it is possible to compute the final pixel color quickly by compositing the first few unclipped samples before the front-most visible partition, with the color stored in that partition, and then with the background. Consider again the example used for equation (6) and (7). Let the samples (i, i+1, . . . , j) fall in the mth partition, and suppose the samples (1, 2, . . . , k), where i≦k<j, are clipped by the clipping plane. Then, using equations (8) and (9), the color of the pixel is shown in FIG. 11.

$$C = c_{k+1} \text{over} c_{k+2} \text{over} \ldots \text{over} c_j \text{over} \check{C}_{m+1} \text{over} c_{bg} \quad (8)(10)$$

Equations (6), (7) and (10) result in exactly the same color. However, equation (10) will result in the smallest amount of per-frame computation among the three.

FIG. 11 shows a schematic representation 1100 of the partitions created from ray samples for a translucent transfer function. A ray sample 1120 has partitions 1102, 1106, 1108 and 1110. Partition 1102 begins at sample point 712 and terminates at the end of the ray 1120 and is represented by function $\check{C}_1$, $T_1$. Partition 1106 begins at sample point 716 and terminates at the end of the ray 1120 and is represented by function $\check{C}_2$, $T_2$. Partition 1108 begins at sample point 720 and terminates at the end of the ray 1120 and is represented by function $\check{C}_3$, $T_3$. Partition 1110 begins at sample point 724 and terminates at the end of the ray 1120 and is represented by function $\check{C}_4$, $T_4$.

Opaque Transfer Functions

The method presented in the previous section increases the melt-through interaction speed by reducing the number of data samples that we need to compute along each ray. For any given ray, in the worst case, the number of samples computed is equal to one less than the number of samples inside a partition. If the partition size is d, then the maximum number of samples computed for a ray for a given frame is d−1. After d−1 samples, it is possible to find the next partition. Also, the average number of samples before hitting the next partition is d/2.

In case of opaque transfer functions, the rays terminate quickly because the opacities of the samples are high. If the ray terminates, on an average, before d/2 samples, then there will not be any appreciable speed up due to the partitioning scheme. Thus, it is an embodiment of the present invention to store l samples in a buffer for each ray, where l is dependent on d. It is possible to reuse these samples as the clipping plane moves, thus saving time spent in data access and interpolation. Since the user can move the clipping plane both forward and backward, it is preferable to have samples on both sides of the clipping plane. A small fraction of these l samples are computed by shooting the ray in the backward direction from the clipping plane. Every new frame, the buffer is moved along with the clipping plane. If the current position of the buffer partly overlaps the position in the last frame, the samples from the previous frame can be used to fill in to buffer. For the unfilled part of the buffer, new samples are computed and used to fill in the buffer, and these can be reused in future frames if needed.

Figure 12:
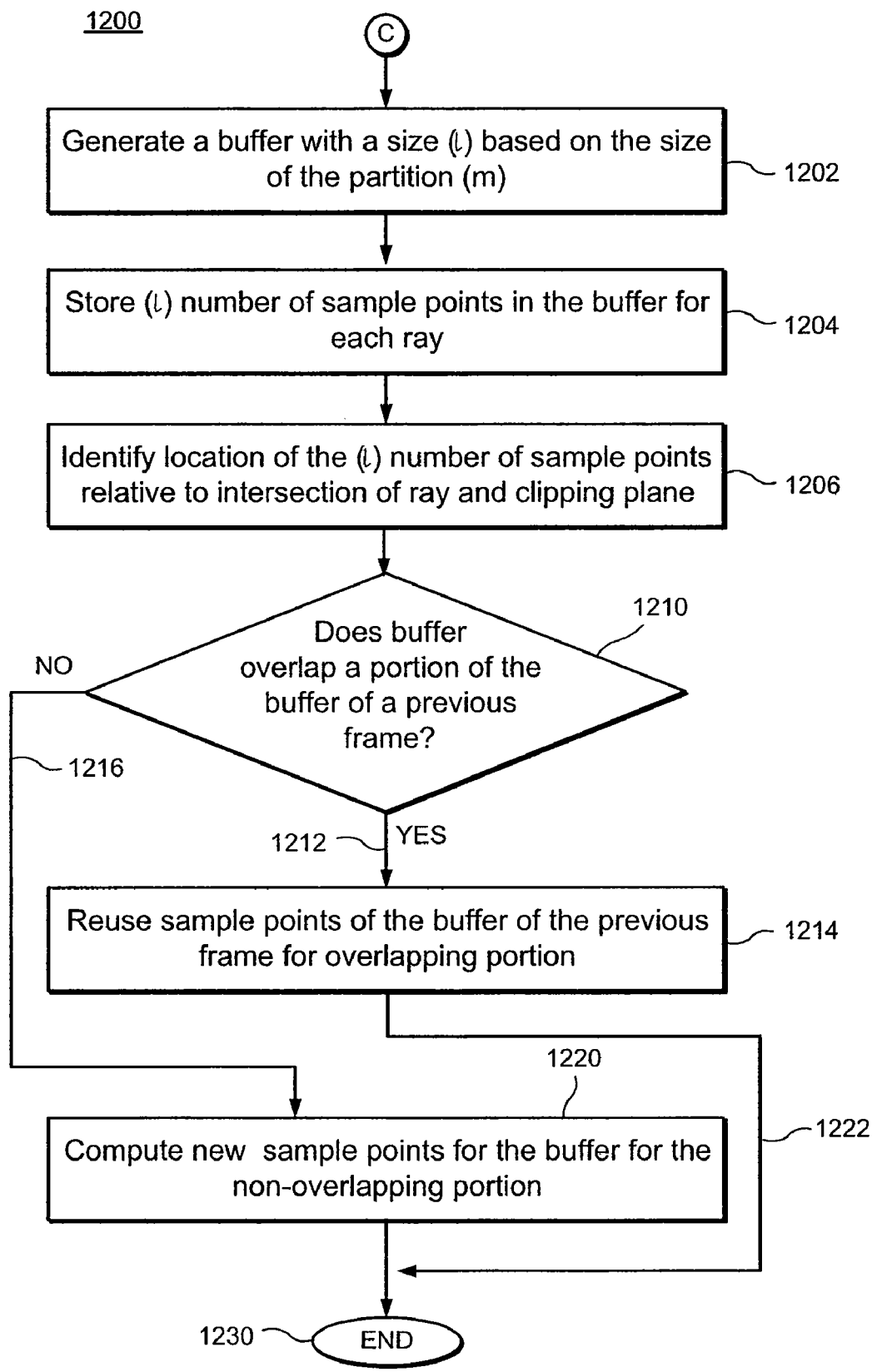
FIG. 12 shows an algorithm for opaque transfer functions according to an embodiment of the present invention.

FIG. 12 shows a flowchart 1200 (element C in FIG. 6) of steps to utilize a buffer in a direct volume rendering process. The steps 1200 may be executed by a processor, or otherwise executed to perform the identified functions and may also be stored in one or more memories. For example, the steps of FIG. 12 may be stored on a computer-readable medium, such as ROM, RAM, EEPROM, CD, DVD, or other non-volatile memory. A buffer is generated with a size (l), which is based on the size of the partition (m), as shown in step 1202. Next, (l) number of sample points, for each ray, are stored in the buffer, as shown in step 1204. The location of the (l) number of sample points relative to the intersection of the ray and the clipping plane is then identified, as shown in step 1206.

Decision step 1210 determines whether the buffer of a current frame overlaps a portion of the buffer of a previous frame. If so, "yes" line 1212 leads to step 1214 that re-uses sample points of the buffer of the previous frame for the overlapping portion since, in a melt through manipulation, it is not necessary to re-sample the overlapping samples.

If the buffer of a current frame does not overlap a portion of the buffer of a previous frame, "no" line 1216 leads to step 1220 in which new sample points for the buffer for the non-overlapping portion are computed. End step 1230 shows the algorithm 1000 terminates.

Incremental Updates from Previous Rendering

If the clipping plane is moved by small amounts, then there are only a few samples between the old and the new positions of the clipping plane, since the previous samples may be re-used. It is possible to utilize the advantage of this fact by updating the current rendering with a correction for the samples that lie in between the former and current clipping plane.

For example, one embodiment of the present invention is when the clipping plane is moved backward during a melt-through interaction. Then, in addition to the previous samples, it is beneficial to composite the new samples in between the current and the previous clipping plane positions (see FIG. 14). Since the final composited result is known at the previous plane (set that quantity to $C_{prev}$) the new final result may be calculated by adding the composited color of the intermediate samples ($C_{interm}$). Then, $$C_{new} = C_{interm} \text{ over } C_{prev} \qquad (11)$$

Similarly, if the clipping plane moves forward, it is possible to remove $C_{interm}$ from $C_{prev}$. In this case, $$C_{new} = C_{interm} \text{ over } C_{new} \qquad (12)$$
$$= C_{interm} + T_{interm} \cdot C_{prev}$$

$C_{new}$, can be calculated by solving the above equation. Using equations (11) and (12), it is possible to create a new rendering with very few samples.

When using equation (11) and (12) to remove $C_{interm}$ from $C_{prev}$ (decompositing), it may result in large numerical error or even make the operation ill-conditioned if $T_{interm}$, is nearly transparent (≈0). Therefore, decompositing shall only be used when $T_{interm}$, is near 1 (opaque).

Figure 13:
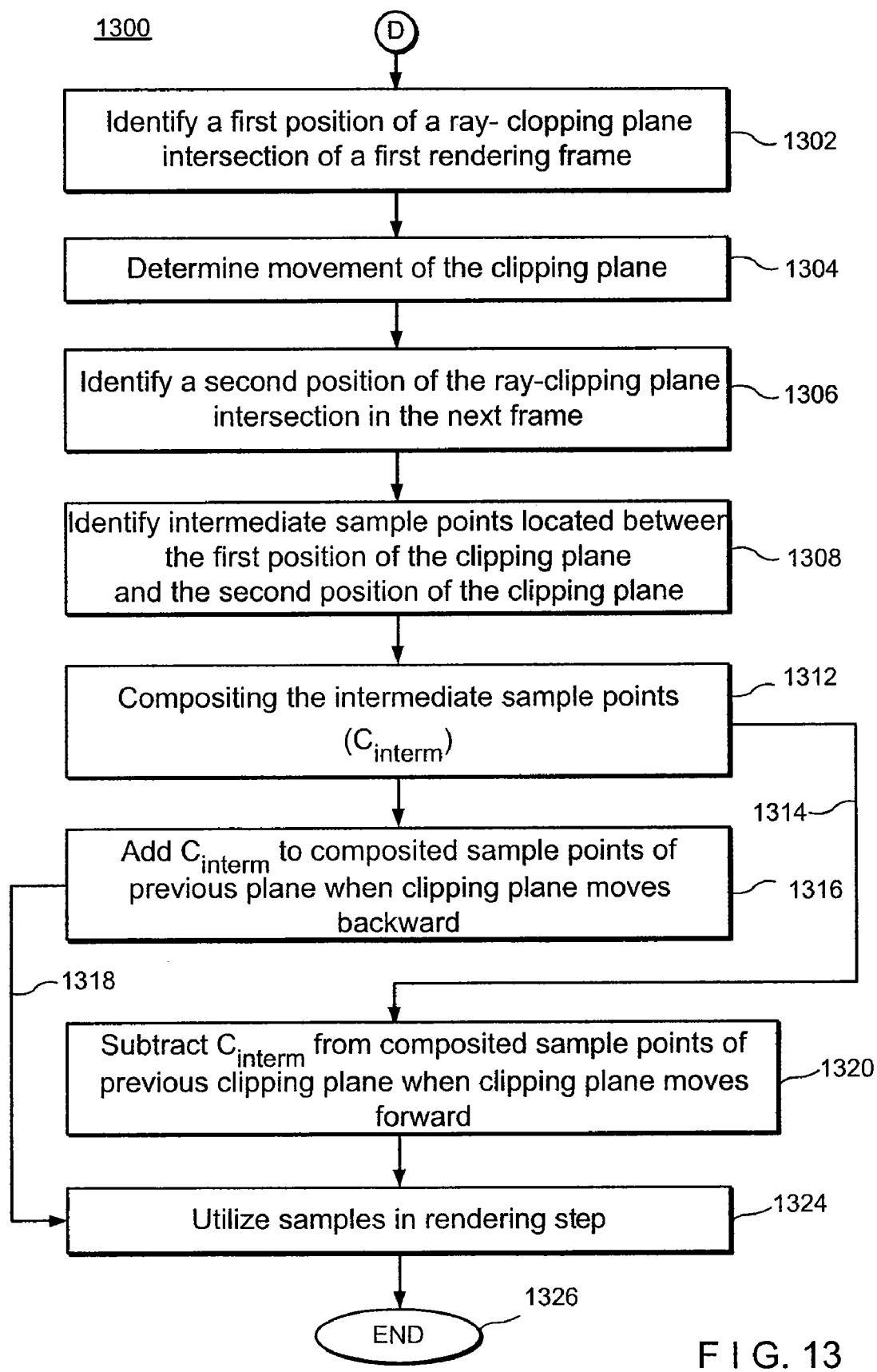
FIG. 13 shows an algorithm for incremental updates from a previous rendering according to an embodiment of the present invention.

FIG. 13 shows a flowchart of steps 1300 (element D shown in FIG. 6) to implement an embodiment of the present invention. The steps 1300 may be executed by a processor, or otherwise executed to perform the identified functions and may also be stored in one or more memories. For example, the steps of FIG. 13 may be stored on a computer-readable medium, such as ROM, RAM, EEPROM, CD, DVD, or other non-volatile memory. A first position of a ray-clipping plane intersection of a rendering frame is identified, as shown in step 1302. Clipping plane movement is determined, as shown in step 1304.

A second position of the ray-clipping plane intersection of the next frame is identified, as shown in step 1306. Intermediate sample points that are located between the first position and the second position of the clipping plane are identified, as shown in step 1308. The intermediate sample points identified are then composited ($C_{interm}$), as shown in step 1312. When the clipping plane is moved forward, line 1314 leads to subtracting the composited intermediate sample points ($C_{interm}$) from the composited sample points from the previous clipping plane ($C_{prev}$), as shown in step 1320. (See FIG. 14).

When the clipping plane is moved backward the composited intermediate sample points ($C_{interm}$) are added to the composited sample points from the previous clipping plane ($C_{prev}$), as shown in step 1316. (See FIG. 14).

Step 1324 shows that the sample points, thus modified by clipping plane movement are utilized in the rendering step. The algorithm is then terminated at end step 1326.

FIG. 14 shows a schematic representation 1400 of incremental updates when the clipping plane changes by a small amount. The representation 1400 shows a ray 1402 having sample points 1404(*a*) through 1404(*n*), where n is any suitable number. A previous clipping plane 1406 was placed by the user along the ray. The colors samples 1404(*g*) through 1404(*n*) within the partition viewed during the location of previous clipping plane 1406 were composited into $C_{prev}$ 1450. The user then moved the current clipping plane 1402 to its location near sample 1404(*e*). Instead of compositing the colors samples 1404(*e*) through 1404(*n*), the colors of samples 1404(*e*) and 1404(*f*) may be composited into a value called $C_{interm}$ 1460. $C_{interm}$ 1460 may then be added to $C_{prev}$ 1450 to arrive at the new color composite of the samples. This system and method of the present invention allows for faster composition of the color values of samples for small movements of the clipping plane. The next partition begins at partition 1428 since the previous clipping plane 1450 and the current clipping plane position the melt through partition at partition 1428.

Caching First-Hit Position from Previous Frames

When reviewing the melt-through operation, it is observed that there are many image areas which were unchanged between consecutive frames. These unchanged areas indicate that there are empty spaces (transparent regions) between the current clipping plane position and the first non-transparent voxel. For these particular rays, the clipping plane is being moved only in the empty space between the previous clipping position and the first non-translucent voxel, and hence the rendering results in these regions remain the same as those in the last frame. It an embodiment of the present invention that this is recognized and that the position of the empty space is stored—that is, the current clipping plane and the first non-empty sample positions are stored as the start and end of the empty space. In the next frame, if the cut-plane position lies within this empty space, it is possible to avoid casting the ray in those unchanged areas and reuse the results of the previous frame. This will further speed up the rendering performance without any quality loss. It is also an embodiment of the present invention to change the position of the empty space and the saved result only when the clipping plane moves out of the region.

Figure 15:
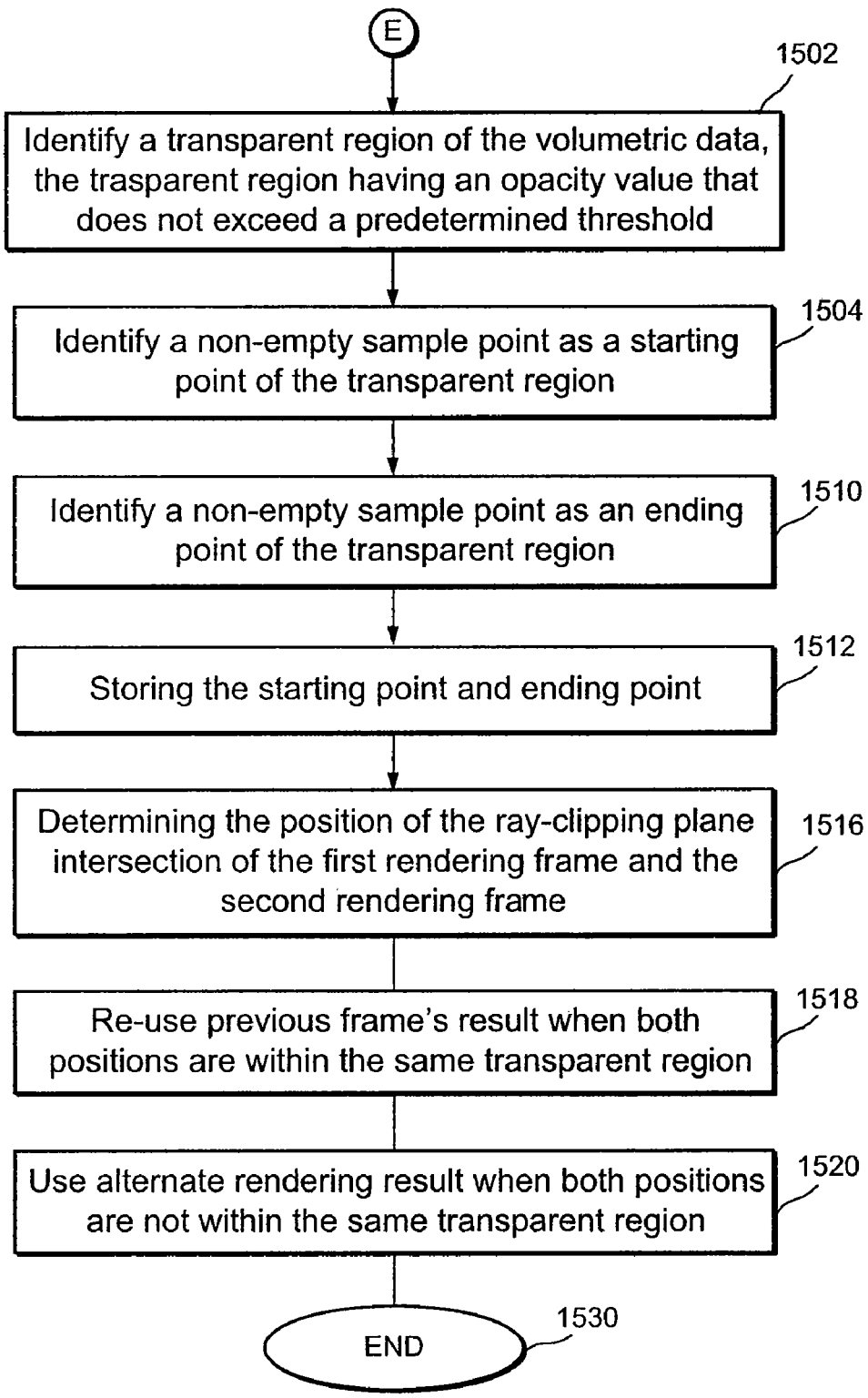
FIG. 15 shows an algorithm for caching a first-hit position from previous frames according to an embodiment of the present invention.

FIG. 15 shows a flowchart of steps 1500 (element E in FIG. 6) to implement an embodiment of the present invention. The steps 1500 may be executed by a processor, or otherwise executed to perform the identified functions and may also be stored in one or more memories. For example, the steps of FIG. 15 may be stored on a computer-readable medium, such as ROM, RAM, EEPROM, CD, DVD, or other non-volatile memory. A transparent region of the volumetric data is identified, as shown in step 1502.

A transparent region is one that has an opacity value below a predetermined threshold. A non-empty sample point is identified as a starting point of the transparent region, as shown in step 1504. A non-empty sample point is identified as an ending point of the transparent region, as shown in step 1510. The starting point and ending point are stored, as shown in step 1512. The position of the ray-clipping plane intersection of the first rendering frame and the second rendering frame are determined, as shown in step 1516.

When both the starting position and the ending position are within the same transparent region, the previous frame's result may be reused, as shown in step 1518.

When both the starting position and the ending position are not within the same transparent region, an alternate rendering procedure may be used, as shown in step 1520. The alternate rendering procedure may include any of the rendering procedures described herein. The algorithm is then terminated, as shown in step 1530.

The following table summarizes the speed improvements for the different optimizations disclosed herein. The tests for the melt-through were done for a 512×512×500 16-bit dataset, for a 1000×1000 display window.

Table 1 shows timing results for the ray-caster for the different optimizations proposed by the present invention

| Algorithm | Time per frame |
| --- | --- |
| Ray casting without any optimization (but using space-leaping and early ray termination) | 2763-3145 |
| Using partitions | 231-256 |
| Using cumulative compositing | 164-197 |
| Incremental updates from previous rendering, with cumulative compositing | 146-174 |
| Caching first hit position, with cumulative compositing | 104-134 |
| Incremental updates, first hit, cumulative compositing | 95-135 |

It will be appreciated from the above that an embodiment of the invention may be implemented as computer software, which may be supplied on a storage medium or via a transmission medium such as a local-area network or a wide-area network, such as the Internet. It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A method utilizing a processor for rendering an image using raycast visualization, the method comprising:
    a pre-processing procedure comprising:
        computing a sample sequence along each ray that passes through volumetric data;
        dividing each sample sequence of each ray into a plurality of partitions (m), each partition (in) having a number of sample points (d);
        compositing, for each ray, each sample point (d) of each partition (m) to produce an RBGA-tuple for each partition;
        storing the RBGA-tuple for each partition;
    a volume rendering procedure for each ray comprising:
        identifying a location of an intersection of a ray with a clipping plane;
        compositing the stored RBGA-tuple of each partition subsequent to the clipping plane;
        rendering the volumetric image using the composited RBGA-tuple of each partition subsequent to the clipping plane
        identifying a first position of a ray-clipping plane intersection of a first rendering frame;
        determining movement of the clipping plane;
        identifying a second position of the ray-clipping plane intersection in a next frame;
        identifying intermediate sample points located between the first position of the clipping plane and the second position of the clipping plane;
        compositing the intermediate sample points; and
        utilizing the composited intermediate sample points in the rendering step.

2. The method as claimed in claim 1, wherein the volume rendering step further comprises:
   identifying a partition that the clipping plane cuts through; and
   interpolating and compositing sample points (d) from the ray-clipping plane intersection to the beginning of a next partition.

3. The method as claimed in claim 1, wherein the partition comprises composited samples from the beginning of the partition to the beginning of a next partition.

4. The method as claimed in claim 1, wherein the partition comprises composited samples from the beginning of the partition to the end of the ray.

5. The method as claimed in claim 1, further comprising:
   generating a buffer that has a size (1) that is a function of the size of the partition (m);
   storing (1) number of sample points in the buffer for each ray; and
   utilizing the buffer in the rendering step.

6. The method of claim 5, wherein
   the (1) number of sample points are located forward and backward of the intersection of the ray and the clipping plane.

7. The method of claim 5 further comprising:
   determining whether the buffer overlaps a portion of the buffer of a previous frame;
   reusing sample points of the buffer from the previous frame for the overlapping portion; and
   computing new sample points for the buffer for the non-overlapping portion.

8. The method as claimed in claim 1, further comprising:
   adding the composited intermediate sample points to the result of the previous rendering frame.

9. The method as claimed in claim 8, further comprising:
   subtracting the composited intermediate sample points from the result of the previous rendering frame.

10. The method as claimed in claim 1, further comprising:
    identifying a transparent region of the volumetric data, the transparent region having an opacity value that does not exceed a predetermined threshold;
    identifying a non-empty sample point as a starting point of the transparent region;
    identifying a non-empty sample point as an ending point of the transparent region;
    storing the starting point and the ending point; and
    determining the position of the ray-clipping plane intersection of the first rendering frame and determining the position of the ray-clipping plane intersection of a second rendering frame.

11. The method as claimed in claim 10, further comprising:
    re-using a previous frame's result when the position of the ray-clipping plane intersection of the first rendering frame and the position of the ray-clipping plane intersection of the second rendering frame are within the same transparent region.

12. The method as claimed in claim 10 further comprising:
    utilizing a sampling procedure when the position of the ray-clipping plane intersection of the first rendering frame and the position of the ray-clipping plane intersection of the second rendering frame are not within the same transparent region.

13. An apparatus for rendering an image using raycast visualization, the apparatus comprising:
    means for computing a sample sequence along each ray that passes through volumetric data;
    means for dividing each sample sequence of each ray into a plurality of partitions (m), each partition (in) having a number of sample points (d);
    means for compositing, for each ray, each sample point (d) of each partition (m) to produce an RBGA-tuple for each partition;
    means for storing the RBGA-tuple for each partition;
    means for identifying a location of an intersection of a ray with a clipping plane;
    means for compositing the stored RBGA-tuple of each partition subsequent to the clipping plane;
    means for rendering the volumetric image using the composited RBGA-tuple of each partition subsequent to the clipping plane means for identifying a first position of a ray-clipping plane intersection of the a rendering frame;
    means for determining movement of the clipping plane;
    means for identifying a second position of the ray-clipping plane intersection in a next frame;
    means for identifying intermediate sample points located between the first position of the clipping plane and the second position of the clipping plane;
    means for compositing the intermediate sample points; and
    means for utilizing the composited intermediate sample points to render the image.

14. The apparatus as claimed in claim 13, further comprising:
    means for identifying a partition that the clipping plane cuts through; and
    means for interpolating and compositing sample points (d) from the ray-clipping plane intersection to the beginning of a next partition.

15. The apparatus as claimed in claim 13, wherein the partition comprises composited samples from the beginning of the partition to the beginning of a next partition.

16. The apparatus as claimed in claim 13, wherein the partition comprises composited samples from the beginning of the partition to the end of the ray.

17. The apparatus as claimed in claim 13, further comprising:
    means for generating a buffer that has a size (1) that is a function of the size of the partition (in);
    means for storing (1) number of sample points in the buffer for each ray; and
    means for utilizing the buffer in the rendering step.

18. The apparatus of claim 17, wherein
    the number of sample points (1) are located forward and backward of the intersection of the ray and the clipping plane.

19. The apparatus of claim 17 further comprising:
    means for determining whether the buffer overlaps a portion of the buffer of a previous frame;
    means for reusing sample points of the buffer from the previous frame for the overlapping portion; and
    means for computing new sample points for the buffer for the non-overlapping portion.

20. The apparatus as claimed in claim 13, further comprising:
    means for adding the composited intermediate sample points to the result of the previous rendering frame.

21. The apparatus as claimed in claim 20, further comprising:
    means for subtracting the composited intermediate sample points from the result of the previous rendering frame.

22. The apparatus as claimed in claim 13, further comprising:

means for identifying a transparent region of the volumetric data, the transparent region having an opacity value that does not exceed a predetermined threshold;

means for identifying a non-empty sample point as a starting point of the transparent region;

means for identifying a non-empty sample point as an ending point of the transparent region;

means for storing the starting point and the ending point; and means for determining the position of the ray-clipping plane intersection of the first rendering frame and determining the position of the ray-clipping plane intersection of a second rendering frame.

23. The apparatus as claimed in claim 22, further comprising:

means for re-using a previous frame's result when the position of the ray-clipping plane intersection of the first rendering frame and the position of the ray-clipping plane intersection of the second rendering frame are within the same transparent region.

24. The apparatus as claimed in claim 22, further comprising:

means for utilizing a sampling procedure when the position of the ray-clipping plane intersection of the first rendering frame and the position of the ray-clipping plane intersection of the second rendering frame are not within the same transparent region.

25. A system comprising:

at least one memory; and at least one processor, coupled to the at least one memory, the at least one processor adapted to store program code for:

a pre-processing procedure comprising:

computing a sample sequence along each ray that passes through volumetric data;

dividing each sample sequence of each ray into a plurality of partitions (m), each partition (in) having a number of sample points (d);

compositing, for each ray, each sample point (d) of each partition (m) to produce an RBGA-tuple for each partition;

storing the RBGA-tuple for each partition;

a volume rendering procedure for each ray comprising:

identifying a location of an intersection of a ray with a clipping plane;

compositing the stored RBGA-tuple of each partition subsequent to the clipping plane;

rendering the volumetric image using the composited RBGA-tuple of each partition subsequent to the clipping plane identifying a first position of a ray-clipping plane intersection of a first rendering frame;

determining movement of the clipping plane;

identifying a second position of the ray-clipping plane intersection in a next frame;

identifying intermediate sample points located between the first position of the clipping plane and the second position of the clipping plane;

compositing the intermediate sample points; and utilizing the composited intermediate sample points in the rendering step.

26. The system as claimed in claim 25, wherein the volume rendering step further comprises program code for:

identifying a partition that the clipping plane cuts through; and interpolating and compositing sample points (d) from the ray-clipping plane intersection to the beginning of a next partition.

27. The system as claimed in claim 25, wherein the partition comprises composited samples from the beginning of the partition to the beginning of a next partition.

28. The system as claimed in claim 25, wherein the partition comprises composited samples from the beginning of the partition to the end of the ray.

29. The system as claimed in claim 25, further comprising program code for:

generating a buffer that has a size (1) that is a function of the size of the partition (m);

storing (1) number of sample points in the buffer for each ray; and utilizing the buffer in the rendering step.

30. The system of claim 29, wherein the (1) number of sample points are located forward and backward of the intersection of the ray and the clipping plane.

31. The system of claim 29, further comprising program code for:

determining whether the buffer overlaps a portion of the buffer of a previous frame;

reusing sample points of the buffer from the previous frame for the overlapping portion; and computing new sample points for the buffer for the non-overlapping portion.

32. The system as claimed in claim 25, further comprising program code for:

adding the composited intermediate sample points to the result of the previous rendering frame.

33. The system as claimed in claim 25, further comprising program code for:

subtracting the composited intermediate sample points from the result of the previous rendering frame.

34. The system as claimed in claim 25, further comprising program code for:

identifying a transparent region of the volumetric data, the transparent region having an opacity value that does not exceed a predetermined threshold;

identifying a non-empty sample point as a starting point of the transparent region;

identifying a non-empty sample point as an ending point of the transparent region;

storing the starting point and the ending point;

determining the position of the ray-clipping plane intersection of the first rendering frame and determining the position of the ray-clipping plane intersection of a second rendering frame.

35. The system as claimed in claim 34, further comprising program code for:

re-using a previous frame's result when the position of the ray-clipping plane intersection of the first rendering frame and the position of the ray-clipping plane intersection of the second rendering frame are within the same transparent region.

36. The system as claimed in claim 34, further comprising program code for:

utilizing a sampling procedure when the position of the ray-clipping plane intersection of the first rendering frame and the position of the ray-clipping plane intersection of the second rendering frame are not within the same transparent region.

* * * * *